(12) United States Patent
Schmidt et al.

(10) Patent No.: US 12,241,789 B2
(45) Date of Patent: Mar. 4, 2025

(54) MEASURING THERMAL RADIATION USING VAPOR CELL SENSORS

(71) Applicant: Quantum Valley Ideas Laboratories, Waterloo (CA)

(72) Inventors: Matthias Schmidt, Waterloo (CA); Stephanie M. Bohaichuk, Waterloo (CA); Vijin Venu, Waterloo (CA); Florian Christaller, Waterloo (CA); Chang Liu, Waterloo (CA); Pinrui Shen, Waterloo (CA); Harald Kubler, Waterloo (CA); James P. Shaffer, Kitchener (CA)

(73) Assignee: Quantum Valley Ideas Laboratories, Waterloo (CA)

( * ) Notice: Subject to any disclaimer, the term of this patent is extended or adjusted under 35 U.S.C. 154(b) by 0 days.

(21) Appl. No.: 18/756,988

(22) Filed: Jun. 27, 2024

(65) Prior Publication Data

US 2025/0003805 A1  Jan. 2, 2025

Related U.S. Application Data

(60) Provisional application No. 63/510,604, filed on Jun. 27, 2023.

(51) Int. Cl.
*G01J 5/46* (2006.01)
*G01J 5/02* (2022.01)
*G01J 5/53* (2022.01)

(52) U.S. Cl.
CPC ............... *G01J 5/46* (2013.01); *G01J 5/026* (2013.01); *G01J 5/53* (2022.01)

(58) Field of Classification Search
CPC ........ G01R 29/0885; G01J 5/46; G01J 5/026; G01J 5/53
See application file for complete search history.

(56) References Cited

U.S. PATENT DOCUMENTS

| 10,509,065 B1 | 12/2019 | Shaffer |
| 10,605,840 B1 | 3/2020 | Amarloo et al. |

(Continued)

FOREIGN PATENT DOCUMENTS

| GB | 2604448 | 9/2022 |

OTHER PUBLICATIONS

Hollberg, L. & Hall, John. (1984). Measurement of the Shift of Rydberg Energy Levels Induced by Blackbody Radiation. Physical Review Letters—Phys Rev Lett. 53. 230-233. 10.1103/PhysRevLett. 53.230. (Year: 1984).*

(Continued)

*Primary Examiner* — John E Breene
*Assistant Examiner* — Janice M Soto
(74) *Attorney, Agent, or Firm* — Henry Patent Law Firm PLLC

(57) ABSTRACT

In a general aspect, a radiometer is disclosed that includes a vapor cell sensor. The vapor cell sensor contains a vapor and is configured to generate an optical signal in response to laser signals and thermal radiation interacting with the vapor. The vapor includes a Rydberg electronic transition that is configured to interact with the thermal radiation. The radiometer also includes a computing system having one or more processors and a memory. The memory stores instructions that, when executed by the one or more processors, are configured to perform operations that include generating, based on the optical signal, transmission data that represents the transmission of the one laser signal through the vapor. The operations also include determining, based on the transmission data, a temperature of a target body that generates the thermal radiation.

26 Claims, 9 Drawing Sheets

(56) References Cited

U.S. PATENT DOCUMENTS

| | | |
|---|---|---|
| 10,802,066 B1 | 10/2020 | Keaveney et al. |
| 10,859,981 B1 | 12/2020 | Ramirez-Serrano et al. |
| 11,054,453 B2 | 7/2021 | Amarloo et al. |
| 11,122,298 B2 | 9/2021 | Fracastoro et al. |
| 11,137,432 B1 | 10/2021 | Amarloo et al. |
| 11,150,285 B2 | 10/2021 | Amarloo et al. |
| 11,300,599 B1 | 4/2022 | Amarloo et al. |
| 11,307,233 B1 | 4/2022 | Amarloo et al. |
| 11,313,926 B1 | 4/2022 | Amarloo et al. |
| 11,366,430 B2 | 6/2022 | Ramirez-Serrano et al. |
| 11,391,797 B1 | 7/2022 | Amarloo et al. |
| 11,658,461 B1 | 5/2023 | Liu et al. |
| 11,885,904 B2 | 1/2024 | Bohaichuk et al. |
| 2020/0292606 A1 | 9/2020 | Holloway et al. |
| 2020/0295838 A1 | 9/2020 | Gordon et al. |
| 2021/0250101 A1 | 8/2021 | Gordon |
| 2022/0291268 A1 | 9/2022 | Anderson et al. |

OTHER PUBLICATIONS

Gallagher, Thomas F, "Rydberg Atoms", Cambridge University Press (1994), 1994, 509 pages.

Adams , et al., "Rydberg atom quantum technologies", J. Phys. B: At. Mol. Opt Phys. 53, Dec. 3, 2019, 14 pgs.

Anderson , et al., "An atomic receiver for AM and FM radio communication", arXiv:1808.08589v1, Aug. 26, 2018, 6 pgs.

Bohaichuk, Stephanie M, et al., "A Three-Photon Rydberg Atom-Based Radio Frequency Sensing Scheme with Narrow Linewidth", arXiv:2304.07409 [physics.atom-ph] (2023), 2023, 11 pages.

Bohaichuk, Stephanie M, et al., "The Origins of Rydberg Atom Electrometer Transient Response and its Impact on Radio Frequency Pulse Sensing", arXiv:2203.01733, Mar. 3, 2022, 21 pgs.

Dixon, Katelyn , "Rydberg atom-based Electrometry Using a Self-Heterodyne Frequency Comb Readout and Preparation Scheme", Physical Review Applied 19, 034078 (2023)., 2023, 18 Pages.

Fan, Haoquan , et al., "Atom based RF electric field sensing", Journal of Physics B: Atomic, Molecular and Optical Physics 48 202001 (2025), Sep. 9, 2015, 17 pgs.

Fan, Haoquan , et al., "Effect of Vapor-Cell Geometry on Rydberg-Atom-Based Measurements of Radio-Frequency Electric Fields", Physical Review Applied 4, 044015 (2015), 2015, 7 pgs.

Fan, H , et al., "Subwavelength microwave electric-field imaging using Rydberg atoms inside atomic vapor cells", Optics Letters, vol. 39, No. 10, 3030-3033, May 15, 2014, 4 pgs.

Fleischhauer , et al., "Electromagnetically induced transparency: Optics in coherent media", Rev. Mod. Phys. 77, 633, 2005, 42 pgs.

Simons , et al., "Rydberg atom-based sensors for radio-frequency electric field metrology, sensing, and communications", Measurement: Sensors 18, Sep. 22, 2021, 4 pgs.

Gea-Banacloche , et al., "Electromagnetically induced transparency in ladder-type inhomogeneously broadeneded media: Theory and experiment", Phys.Rev.A, Jan. 1995, 9 pgs.

Holloway , et al., "Atom-Based RF Electric Field Metrology: From Self-Calibrated Measurements to Subwavelength and Near-Field Imaging", IEEE Transactions on Electromagnetic Compatibility 59, 2, Apr. 2017, 12 pgs.

Holloway , et al., "Broadband Rydberg Atom-Based Electric-Field Probe for SI-Traceable, Self-Calibrated Measurements", IEEE Trans. on Antennas and Propagation, vol. 62, No. 12, Dec. 2014, 14 pgs.

Holloway, Christopher L, et al., "Rydberg atom-based field sensing enhancement using a split-ring resonator", Appl. Phys. Lett. 120, 204001 (2022), May 20, 2022, 7 pages.

Kumar , et al., "Atom-Based Sensing of Weak Radio Frequency Electric Fields Using Homodyne Readout", Scientific Reports 7:42981, Feb. 20, 2017, 10 pgs.

Kumar , et al., "Rydberg-atom based radio-frequency electrometry using frequency modulation spectroscopy in room temperature vapor cells", Optics Express, vol. 25, No. 8, Apr. 17, 2017, 13 pgs.

Liu, Bang , et al., "Highly sensitive measurement of a megahertz rf electric field with a Rydberg-atom sensor", Phys. Rev. Applied 18, 014045 (2022), 2022, 7 pages.

Meyer , et al., "Digital Communication with Rydberg Atoms & Amplitude-Modulated Microwave Fields", arXiv: 1803.03545v2, Oct. 29, 2018, 10 pgs.

Norrgard, Eric B, et al., "Quantum Blackbody Thermometry", New Journal of Physics 23, 033037 (2021), 2021, 13 pages.

Ripka , et al., "Application-driven Problems in Rydberg Atom Electrometry", SPIE2021, 2021, 10 pgs.

Sapiro , et al., "Time dependence of Rydberg EIT in pulsed optical and RF fields", J. Phys. B: Atomic, Molecular and Optical Physics, Apr. 3, 2020, 10 pgs.

Schwettmann, Arne , et al., "Analysis of long-range Cs Rydberg potential wells", Journal of Modern Optics, 54:16-17, 2551-2562, 2007, 13 pages.

Schwettmann, Arne , et al., "Cold Cs Rydberg-gas interactions", Physical Review A, Rapid Communications 74, 020701(R)/1 (2006), 2006, 4 pages.

Schwettmann , et al., "Field-programmable gate array based locking circuit for external cavity diode laser frequency stabilization", Rev.Sci.Instrum. 82, Oct. 7, 2011, 7 pgs.

Sedlacek, J. , et al., "Atom Based Vector Microwave Electrometry Using Rubidium Rydberg Atoms in a Vapor Cell", arXiv:1304.4299v1 [physics.atom-ph], Apr. 15, 2023, 5 pages.

Sedlacek, Jonathon A, et al., "Microwave electrometry with Rydberg atoms in a vapour cell using bright atomic resonances", Nature Physics, vol. 8, 819-824 (2012), Sep. 16, 2012, 6 pgs.

Shaffer, J P, et al., "A read-out enhancement for microwave electric field sensing with Rydberg atoms", Proc. SPIE vol. 10674, Quantum Technologies 2018, 2018, 12 pgs.

ISA, International Search Report and Written Opinion issued in Application No. PCT/CA2024/050865 on Sep. 24, 2024, 8 pages.

* cited by examiner

MEASURING THERMAL RADIATION USING VAPOR CELL SENSORS

CROSS-REFERENCE TO RELATED APPLICATIONS

This application claims priority to U.S. Prov. Pat. App. No. 63/510,604, which was filed on Jun. 27, 2023, and entitled, "Measuring Thermal Radiation Using Vapor Cells." The disclosure of the priority application is hereby incorporated herein by reference in its entirety.

BACKGROUND

The following description relates measuring thermal radiation using vapor cell sensors.

Radiometers measure radiant flux and can operate in the microwave, infrared, and ultraviolet regimes. Commercially, radiometers can be used for remote sensing, although there are applications for temperature measurement and calibration as well. The radiometric services market is currently about $1B and projected to reach about $2B by 2027. Radiometers can operate on aerial, space, and ground-based platforms. The market for radiometers is large and growing, especially as environmental concerns drive monitoring and the desire to increase efficiency in agriculture.

DETAILED DESCRIPTION

Figure 1A:
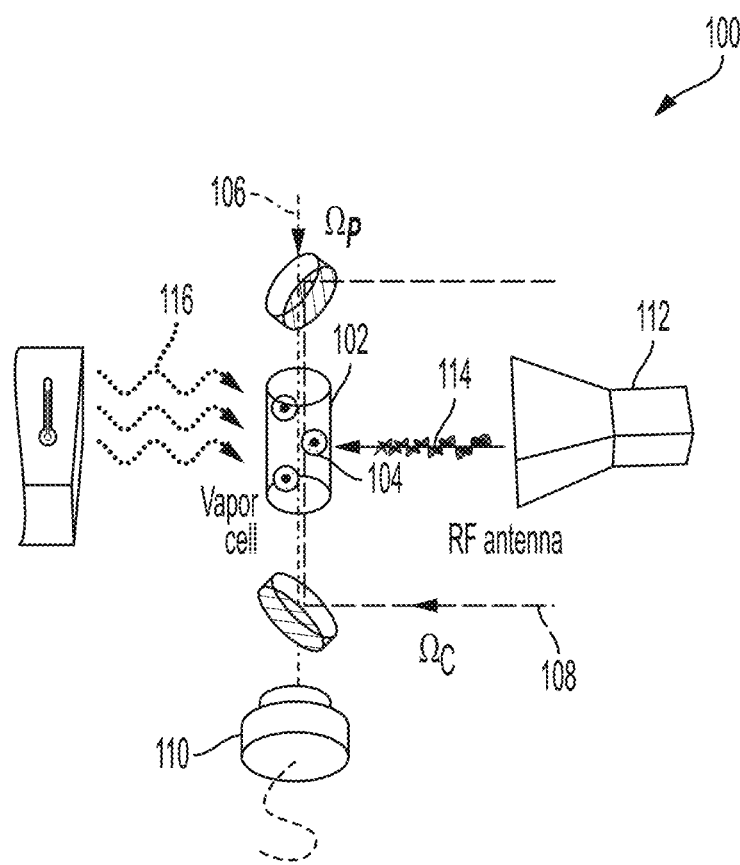
FIG. 1A is a schematic diagram of a first example of a radiometer that includes a vapor cell sensor.

In a general aspect, a vapor cell sensor may be used to measure thermal background radiation temperature and/or flux at a particular set of frequencies precisely. In this capacity, the vapor cell sensor may function as part of a radiometer. For example, a radiometer for measuring thermal radiation may include a laser system and a vapor cell sensor having a vapor therein. The laser system is configured to generate two or more input optical signals, and the vapor cell sensor is configured to generate an output optical signal in response to the two or more input optical signals interacting with its vapor. In some instances, the radiometer may also include a thermal source (e.g., a target body) that generates thermal radiation that interacts with the vapor of the vapor cell sensor. In some instances, the radiometer includes an RF source that is configured to generate an RF electromagnetic field (e.g., a reference RF field) that interacts with the vapor of the vapor cell sensor. In some instances, the radiometer includes a photodetector that is configured to receive the output optical signal from the vapor cell, and in response, generate a detector signal that represents a property of the thermal radiation (e.g., temperature, thermal flux, etc.). Radiometers are important for a number of applications such as, for example, calibration and environmental sensing.

Radiometers are typically configured to measure the temperature and moisture content of objects, which may include objects measured from space (e.g., such as from orbit around the Earth). Measurements are typically taken over relatively long periods of time (e.g., such as during several orbits), making accuracy and drift free measurements important. The radiometers described herein are based on vapor cell sensors, and in some variations, these radiometers are configured as Rydberg vapor-based quantum sensors (e.g., Rydberg atom-based or Rydberg molecule-based quantum sensors). As such, the radiometers may extend the concept of Rydberg vapor-based quantum sensors to measure thermal emission from hot objects (e.g., objects have a temperature at least 300° C.). In some variations, the radiometers are configured to measure thermal emissions from targeted areas on the surface of the earth. In these variations, the radiometers may be configured as imaging radiometers.

In some implementations, the radiometers are based on a vapor cell sensor that is configured to operate in the 'so-called' amplitude regime. The vapor cell may include a vapor that, in many variations, has at least two or more Rydberg electronic states (e.g., a Rydberg vapor). The vapor may include one or both of a vapor of Rydberg atoms and a vapor of Rydberg molecules. The vapor may include, for example, a vapor of Group IA atoms (e.g., Cs, Rb, etc.). The radiometers may also include a laser system for generating optical signals that interact with the vapor in the vapor cell sensor. The radiometers may additionally include a waveguide or antenna that is configured to produce a radio frequency (RF) electromagnetic field. During operation, the vapor cell sensor is illuminated by the RF electromagnetic field supplied by the waveguide or antenna. The amplitude of the RF electromagnetic field can be calibrated using the principles of Rydberg vapor-based sensing. In some variations, the radiometer can additionally include an attenuator. In these variations, the amplitude of the RF electromagnetic field can be determined by ramping up its power and calibrating the attenuator in the RF source using the Rydberg vapor contained in the vapor cell sensor. The attenuator is used to attenuate the RF field so that the waveguide or antenna, the vapor cell sensor, and the laser system operate the Rydberg vapor-based vapor cell sensor in the amplitude regime. In some variations, the laser system includes a probe laser configured to generate a probe laser signal and a coupling laser configured to generate a coupling laser signal.

The response of the vapor in the amplitude regime can depend on the ratio of the Rabi frequency of the RF electromagnetic field irradiating the vapor to the square root of the product of the decay rates of the two Rydberg electronic states interacting with the RF electromagnetic field. Moreover, the transmission of the probe laser signal through the vapor is inversely proportional to the temperature through the dependence of the decay rates on temperature. Ideally, at T=0, the decay rate is the spontaneous emission rate of the Rydberg atom or molecule, but at elevated temperatures black body induced radiation increases the decay rate. Other parameters that determine the change in transmission are physical constants that depend on the structure of the Rydberg atom or Rydberg molecule.

The vapor cell sensor may allow the radiometer to take self-calibrated measurements of the temperature of a target body (e.g., be configured as a self-calibrated radiometer). The sensitivity of the radiometer can be controlled by controlling parameters like the coupling laser Rabi frequency, the Rydberg electronic state used for the measurement, and the Rabi frequency of a reference RF field. In some variations, the radiometer includes the vapor cell sensor, the laser system (e.g., with probe and coupling lasers), an optical waveguide used to couple the laser system to the vapor cell sensor, an RF source and delivery system (e.g., an RF waveguide or antenna), a photodetector to read-out an output optical signal based on the probe laser signal after passing through the vapor of the vapor cell sensor, a computer-based control system (including boards like field programmable gate arrays-FPGAs), a signal processing system, and a user interface. Other components are possible.

In another aspect, the radiometers disclosed herein can, in certain cases, operate in a range spanning from about 0.100 GHz to about 300 GHz (e.g., a microwave range). In some configurations, the radiometer can make measurements across large spans of the operating range and dynamically in excess of 40 GHz in some cases. In doing so, the radiometer can also act as a spectrum analyzer for background RF radiation. In other configurations, the radiometer can be configured for high sensitivity at a single microwave frequency. However, in certain cases, the radiometer can be configured to function at several frequencies simultaneously. In these latter cases, each different frequency of the parallel radiometer can be dynamically scanned. The radiometer can be utilized in many ways as the vapor cell sensor allows a fundamentally new way to measure thermal radiation. As such, the radiometer can replace technologies such as bolometers for some applications. Some notable advantages of the radiometer, and especially the vapor cell sensor, are its dielectric construction, bandwidth, sensitivity, and ability to be self-calibrated. The measurement of thermal radiation described herein is distinct from that used for the Rydberg atom-based RF sensing.

Replacing radiometers on satellites and unmanned aerial vehicles with self-calibrated radiometers has significant advantages, especially when considering that the overall detector package of the self-calibrated radiometers can be significantly more compact. The platforms of satellites and unmanned aerial vehicles are constrained in size and are expensive. As a consequence, they tend to be jammed with as many sensors as possible, making interference and size constraints critical. By almost completely removing undesirable materials—e.g., metals from the radiometer and tailoring its geometry to enhance desirable electromagnetic properties-new types of measurement are possible.

Moreover, imaging radiometers can be designed to view the Earth's surface or an object from space (e.g., orbit around the Earth). Imaging radiometers are typically used to measure the properties of objects, such as their temperature and moisture content. Such measurements can be achieved by recording information about these properties over time, such as through radiometric images taken at different geographic locations and at different times. The measured properties can then be used to map quantities such as ice thickness over time from space. Microwaves may be used to measure the thickness of snow and ice, as well as map the water content of soil in agricultural environments. The wavelengths of microwaves allow observers to use them for both remote sensing from satellites and ground-based measurements that are unaffected by precipitation or clouds. The self-calibrated radiometers can be unpolarized or dual polarized. The self-calibrated radiometers can also be used for meteorological observations including quantitative weather prediction, climate monitoring and satellite tracking.

Now referring to FIG. 1A, a schematic diagram is presented of an example radiometer 100 that includes a vapor cell sensor 102. The presence of the vapor cell sensor 102 may allow the example radiometer 100 to be a self-calibrated radiometer. The vapor cell sensor 102 may contain a vapor 104 therein, such as a vapor of Rydberg atoms or a vapor of Rydberg molecules. The example radiometer 100 includes a laser system having at least two lasers. For example, the laser system may include a probe laser configured to generate a probe laser signal 106 and a coupling laser configured to generate a coupling optical signal 108. The transmission of a probe laser signal 106 is observed through the vapor 104 in the presence of the other laser signals (e.g., the coupling laser signal 106), which are used to couple the probe optical transition to a Rydberg electronic transition. In FIG. 1A, one coupling laser signal is shown. However, other numbers of coupling laser signals are possible (e.g., two, three, etc.). During operation, transmission of the probe optical signal 106 through the vapor cell sensor 102 is detected on an optical detector 110 (e.g., a photodiode). Using an RF source 112, an RF electromagnetic field 114 is applied concurrently to the vapor cell sensor 102 to place it in the 'so-called' amplitude regime. An RF waveguide or antenna may be used as the RF source 112 of the example radiometer 100. However, other types of RF sources are possible.

The absorption of electromagnetic radiation by the example radiometer 100 (e.g., one or both of optical and RF electromagnetic radiation) can then be modulated by thermal radiation 116 incident on the vapor cell sensor 102. The power of the incident RF electromagnetic field 114 can be calibrated using Rydberg vapor-based sensing principles. The RF electromagnetic field 114 can be ramped down to a known field amplitude in the amplitude regime using, for example, an RF attenuator. In some variations, the probe laser signal 106 is readout in parallel using an optical frequency comb. In some variations, the probe laser signal 106 is of fixed frequency near resonance with a probe optical transition and its transmission through the vapor 104 is measured. Combinations of such readout methods can be used.

In many implementations, the vapor 104 in the vapor cell sensor 102 is a Rydberg vapor that includes a vapor of Rydberg atoms, a vapor of Rydberg molecules, or both. The Rydberg vapor may include a first type of electronic transition that can interact with (e.g., absorb, transmit, etc.) RF electromagnetic fields, such as a Ryberg electronic transition. The Ryberg electronic transition may be defined by a pair of Rydberg electronic states of the Rydberg vapor. The Rydberg vapor may also include a second type of electronic transition that can interact with optical electromagnetic fields (e.g., optical signals from a laser), such as an optical electronic transition. The second type of electronic transition may also be defined by a pair of electronic states of the Rydberg vapor. For example, the Rydberg vapor may be a vapor of Rydberg atoms (e.g., Cs, Rb, etc.) having a single instance of the first type of electronic transition. The single instance may, in certain cases, be configured to interact with the RF electromagnetic radiation 114 generated by the RF source 116. The vapor of Rydberg atoms may also have two instances of the second type of electronic transition. The two instances may, in certain cases, be configured to interact with laser signals generated by a laser system (e.g., a probe optical signal and a coupling optical signal).

Figure 1B:
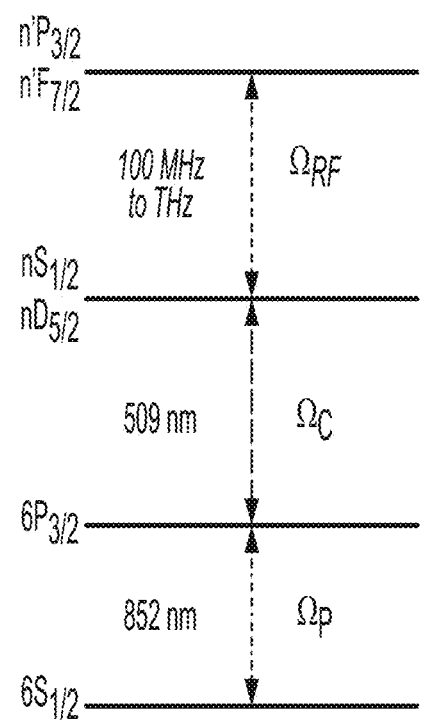
FIG. 1B is a schematic diagram of an example of an energy level diagram for a vapor of the vapor cell of FIG. 1A.

FIG. 1B presents a schematic diagram of an example of an energy level diagram for the vapor 104 of the vapor cell sensor 102 of FIG. 1A. The energy level diagram has three electronic transitions between four electronic states, which may include Rydberg electronic states. The energy level diagram may correspond to that of a cesium vapor. For example, the energy level diagram may include first and second electronic transitions that are defined between a first electronic state (e.g., $6S_{1/2}$), a second electronic state (e.g., $6P_{3/2}$), and a Rydberg electronic state (e.g., $nD_{5/2}$ or $nS_{1/2}$). The second electronic state may be shared between the first and second electronic transitions, and these transitions may correspond to optical electronic transitions. The energy level diagram may also include a third electronic transition. The third electronic transition may correspond to a Rydberg electronic transition and may be defined between the third electronic state and the Rydberg electronic state (e.g., $n'F_{7/2}$ or $n'P_{3/2}$).

During operation of the example radiometer 100, the electronic transitions of the vapor 104 may allow a two-photon readout and preparation scheme. For example, the first and second electronic transitions may interact with probe and coupling laser signals 106, 108 to generate an output optical signal from the cesium vapor. The third electronic transition may interact with the RF electromagnetic radiation 114 from the RF source 116 to alter an absorption or transmission of the probe and coupling laser signals 106, 108 by the first and second electronic transitions. The third electronic transition may also interact with the thermal radiation 116 which, in some instances, may be from a target body under measurement. Although FIG. 1B presents the energy level diagram as having a laddered order, other types of ordering are possible.

In many implementations, the electronic transitions of the vapor 104 allow the example radiometer 100 to be self-calibrated. At present, no radiometers are known to be self-calibrated. However, a radiometer that is self-calibrated can make stable measurements over time. Moreover, self-calibrated radiometers offer advantages over conventional radiometers. For example, the example radiometer 100 may be based on the loss of coherence due to black-body enhancement of the decay rates. In some variations, the example radiometer 100 is operated on resonance. However, the example radiometer 100 can operate on different principles than Rydberg vapor-based sensing. The example radiometer 100 may rely on a Rydberg vapor that operates in the amplitude regime and determines the temperature of a thermal source by observing how the decay and dephasing rates change the transmission of the probe laser signal 106 due to the thermal population of the other RF modes in the vapor 104.

In some implementations, the example radiometer 100 uses a Rydberg vapor under the illumination of a known, calibrated RF source. For example, the RF source 112 may be configured to generate a reference RF electromagnetic field that has one or more known and calibrated properties (e.g., an amplitude). In these implementations, the example radiometer 100 may be configured to measure the temperature of a target object based on the effect that thermal radiation has on the lifetimes of the Rydberg electronic states. For example, the probe laser signal 106 may pass through the vapor cell sensor 102 when the vapor 104 is in the amplitude regime. The absorption of probe laser signal 106 by the vapor 104 may then be affected by thermal radiation because it is the coherence parameter (CRF) that enters into the equations. The coherence parameter is described below in relation to Equations (1)-(20). The transmission of the probe laser signal 106 changes in a known way based on the background temperature. Precisely measuring the transmission of the probe laser signal 106 through the vapor cell sensor 102 and knowing the RF Rabi frequency, and in some cases, also the coupling laser Rabi frequency in the weak probe regime, allows the temperature to be determined since the decay constants of the Rydberg electronic state change in a known way as the temperature changes.

Figure 2A:
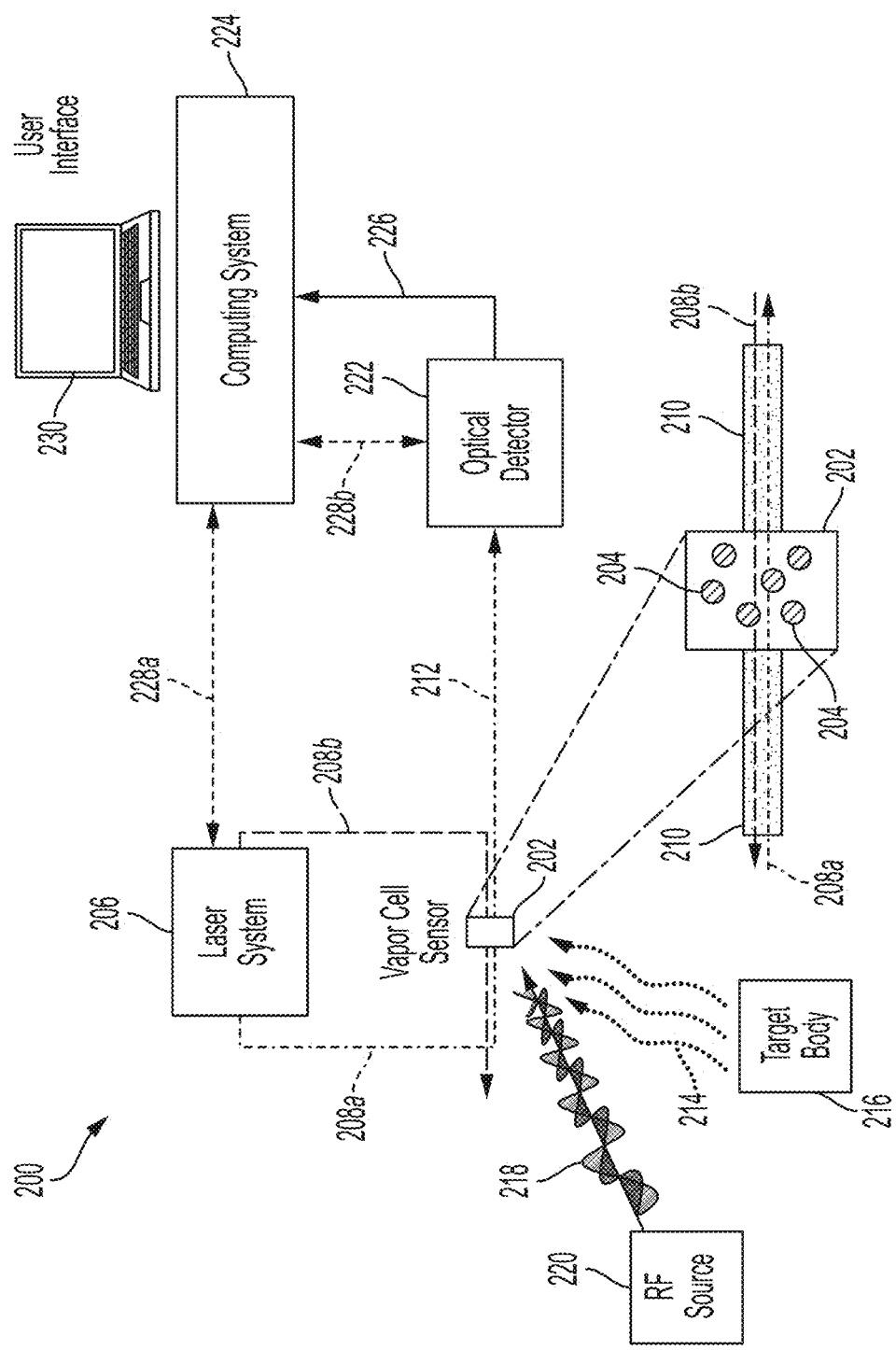
FIG. 2A is a schematic diagram of a second example of a radiometer that includes a vapor cell sensor.

Now referring to FIG. 2A, a schematic diagram is presented of a second example radiometer 200 that includes a vapor-cell sensor 202. The example radiometer 200 may be configured to measure thermal radiation, including properties thereof (e.g., temperature, thermal flux, etc.). The vapor cell sensor 202 contains a vapor 204 having electronic states, such as Rydberg electronic states. The vapor 204 may, for example, include one or both of a vapor of Rydberg atoms (e.g., Rb, Cs, etc.) and a vapor of Ryberg molecules (e.g., $H_2$, $I_2$, etc.). In these cases, the vapor cell sensor 202 may be a Rydberg vapor-based sensor. In many implementations, the vapor 204 includes a Rydberg electronic transition that is configured to interact with thermal radiation, such as thermal radiation from a target body. In some instances, the Rydberg electronic transition is configured to interact with thermal radiation corresponding to black body temperatures greater than 300° C.

Figure 2B:
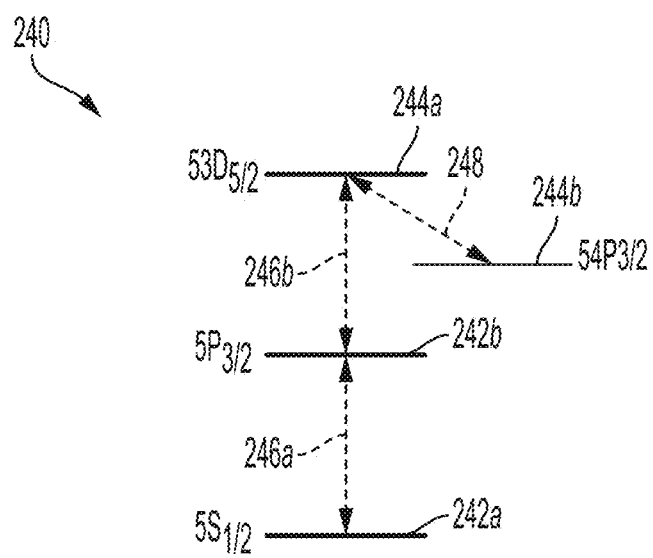
FIG. 2B is a schematic diagram of an example set of electronic states for a vapor of Rb atoms.

In some implementations, the vapor 204 includes a plurality of electronic states that define a ladder of electronic states. For example, FIG. 2B presents a schematic diagram of an example set of electronic states 240 for a vapor of Rb atoms. The example set of electronic states 240 includes first and second electronic states 242a, 242b and first and second Rydberg electronic states 244a, 244b. These states are labeled in FIG. 2B using spectroscopic notation—i.e., $5S_{1/2}$, $5P_{3/2}$, $53D_{3/2}$, and $54P_{3/2}$, respectively—that is applicable to Rb atoms. The first electronic state 242a, the second electronic state 242b, and the first Rydberg electronic state 244a are progressively higher in energy and define a ladder of electronic states. Moreover, the second Rydberg electronic state 244b is lower in energy than the first Rydberg electronic state 244a. However, in some implementations, the second Rydberg electronic state 244b may be higher in energy than the first Rydberg electronic state 244a.

The example set of electronic states 240 defines electronic transitions of the vapor of Rb atoms. For example, the energy gap between the first and second electronic states 242a, 242b define a first optical electronic transition 246a. Similarly, the energy gap between the second electronic state 242b and the first Rydberg electronic state 244a defines a second optical electronic transition 246b. The first and second optical electronic transitions 246a, 246b may interact with (e.g., absorb) optical signals, such as laser signals from a laser system. In some variations, the first and second optical electronic transitions 246a, 246b correspond to probe and laser optical transitions. As another example, the energy gap between the first and second Rydberg electronic states 244a, 244b may define a Rydberg electronic transition 248 that interacts with (e.g., absorbs) one or both of an RF electromagnetic field and thermal radiation. The RF electromagnetic field may be emitted from an RF waveguide or RF antenna, and the thermal radiation may be emitted by target body at a known or unknown temperature.

Figure 2C:
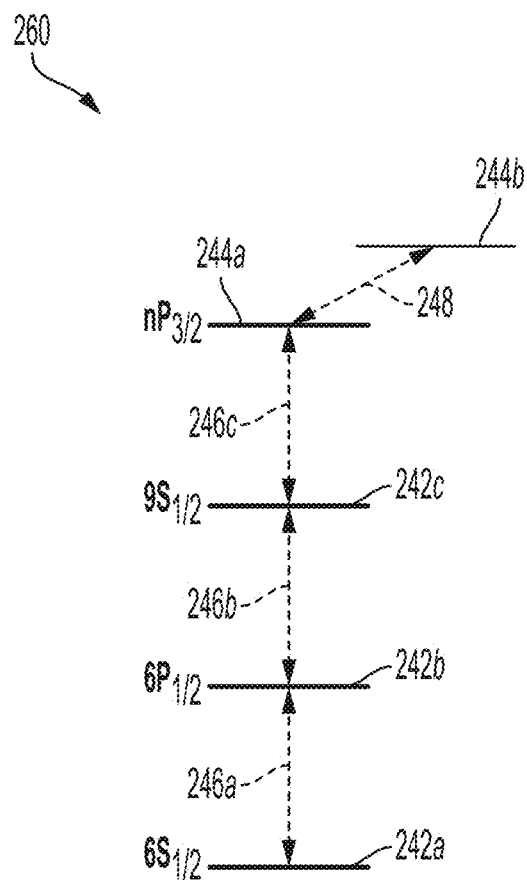
FIG. 2C is a schematic diagram of an example set of electronic states for a vapor of Cs atoms.

In FIG. 2B, the example set of electronic states 240 is depicted as having four electronic states, with two being Rydberg electronic states. However, other numbers and combinations of electronic states and Rydberg electronic states are possible. For example, FIG. 2C presents a schematic diagram of an example set of electronic states 260 for a vapor of Cs atoms. The example set of electronic states 260 includes a third electronic state 242c such that the first electronic state 242a, the second electronic state 242b, the third electronic state 242c, and the first Rydberg electronic state 244a are progressively higher in energy (e.g., define a ladder of electronic states). The energy gap between the second and third electronic states 242b, 242c defines a third optical electronic transition 246c that is configured to interact with (e.g., absorb) optical signals. In FIG. 2C, the second Rydberg electronic state 244b is higher in energy than the first Rydberg electronic state 244a. However, in some implementations, the second Rydberg electronic state 244b may be lower in energy than the first Rydberg electronic state 244a. In some variations, the first optical electronic transition 246a in FIG. 2C corresponds to a probe optical transition, and the second and third optical electronic transitions 246b, 246c in FIG. 2C correspond to first and second coupling optical transitions, respectively.

Now referring back to FIG. 2A, the example radiometer 200 also includes a laser system 206 that is optically coupled to the vapor cell sensor 202, such as through free space or through an optical fiber assembly. The laser system 206 is configured to generate laser signals 208 that are transmitted to the vapor cell sensor 202. For example, the laser system 206 may generate a probe laser signal 208a and a coupling laser signal 208b that are guided by optical fibers 210 to interact with the vapor 204 of the vapor cell sensor 202. FIG. 2A depicts two laser signals 208 defined by, respectively, probe and coupling laser signals 208a, 208b. However, other numbers of laser signals 208 are possible (e.g., one probe laser signal and two coupling laser signals). FIG. 2A also depicts the laser signals 208 as counter-propagating through the vapor 204 along opposing optical paths. However, other configurations of optical paths are possible (e.g., parallel propagation), including other numbers of optical paths. Examples of configurations of laser signals and their interactions with Rydberg vapors are described further in U.S. Pat. No. 10,509,065 entitled "Imaging of Electromagnetic Fields".

In some implementations, the vapor cell sensor 202 generates an optical signal 212 in response to receiving the laser signals 208 and thermal radiation 214. The optical signal 212 may be based on one of the laser signals 208 after passing through the vapor 204. For example, the optical signal 212 may be defined by the probe laser signal 208a after passing through the vapor 204 and while the coupling laser signal 208b also interacts the vapor 204. In this case, the probe and coupling laser signals 208a, 208b may interact together with the target volume of the vapor 204. The optical signal 212 may thus be based on a transmission of the probe laser signal 208a through the vapor 204. The thermal radiation 214 also interacts with the target volume of the vapor 204, thereby altering the transmission of the probe laser signal 208a through the vapor 204. Such altering may include altering an optical property of the probe laser signal 208a, such as an intensity, a frequency, a polarization, or a phase of the probe laser signal 208a. Combinations of altered optical properties are possible. The optical signal 212 may thus be based on a transmission of the probe laser signal 208a through the vapor 204 and may also represent a response of the vapor 204 to the thermal radiation, when present.

In some implementations, the thermal radiation 214 is generated by a target body 216 at a known or unknown temperature. For example, the target body 216 may be a reference body at a known, reference temperature (e.g., a controlled temperature). In some instances, such as shown in FIG. 2A, the target body 216 may be part of the example radiometer 200. In these instances, the target body 216 may be external to the vapor cell sensor 202 and in thermal communication therewith.

In some implementations, the vapor cell sensor 202 is configured to generate the optical signal 212 in response to a reference RF electromagnetic field 218 interacting with the vapor 204 in addition to the laser signals 208 and thermal radiation 214. The reference RF electromagnetic field 218 is configured to interact with the Rydberg electronic transition of the vapor 204, which may include placing the vapor cell sensor 202 (or vapor 202 therein) in an amplitude regime. For example, the example radiometer 200 may include an RF source 220 that is configured to generate the reference RF electromagnetic field 218. The RF source 220 may include an RF attenuator that is configured to alter an amplitude of the reference RF electromagnetic field 218 to a target amplitude. The target amplitude may have a magnitude that places the vapor cell sensor 202 in an amplitude regime when the reference RF electromagnetic field 218 interacts with the Rydberg electronic transition. The amplitude regime is described further in relation to Equations (1)-(20).

The RF source 220 may, for example, be an RF antenna, an RF waveguide, a maser, or other type of local RF oscillator. Moreover, the reference RF electromagnetic field 218 may be matched to (e.g., be resonant or near resonant with) the Rydberg electronic transition of the vapor 504. In some implementations, the RF source 220 is a reference RF antenna that is an integral part of the vapor cell sensor 202. For example, the vapor cell sensor 202 may include a slot waveguide structure, such as described in U.S. Pat. No. 11,209,473. In some implementations, the RF source 220 is a Rydberg vapor-based maser that is coupled to the vapor cell sensor 202. The Rydberg vapor-based maser may, in certain cases, be an integral part of the vapor cell sensor 202. Examples of the Rydberg vapor-based masers are described in U.S. Pat. No. 11,303,087.

In some implementations, the example radiometer 200 additionally includes an optical detector 222 and a computing system 224. The optical detector 222 is optically coupled to the vapor cell sensor 202 to receive the optical signal 212, such as through free space or through an optical fiber assembly. The optical detector 222 is configured to generate a detector signal 226 in response to receiving the optical signal 212, and the detector signal 226 may represent the transmission of the one laser signal 208 (e.g., the probe laser signal 208a) through the vapor 204. In doing so, the detector signal 226 may represent one or more optical properties of the optical signal 212. For example, the optical detector 222 may include a photodetector that is configured to generate electrical signals in response to measuring an amplitude of the optical signal 212. However, other optical properties of the optical signal 212 are possible, such as a frequency, a polarization, and a phase of the optical signal 212. Combinations of optical properties are also possible.

The optical detector 222 may include one or more optical elements (e.g., lenses, mirrors, polarizers, filters, gratings, beam splitters, etc.) that can be controlled to manipulate the optical signal 212. Such manipulation may allow the optical detector 222 to measure a target optical property of the optical signal 212, such as via a photodetector. In some implementations, the optical detector 222 includes a photodetector configured to measure a target optical property of the optical signal 212, such as an amplitude of the optical signal 212 at a specific frequency (or within a range of frequencies). In these implementations, the optical detector 222 may include multiple photodetectors, each configured to measure a different target property of the optical signal 512. In some implementations, the optical detector 222 may include an optical frequency comb to measure multiple frequencies of the optical signal 222 at virtually the same time.

The computing system 224 may include subsystems such as a signal processing unit, a data processing unit (e.g., a computer), a power control unit, a network interface, and so forth. In some implementations, the computing system 224 is configured to receive the detector signal 226 from the optical detector 222 and may include analog electronics, digital electronics, or both, for processing the detector signal 226 once received. The computing system 224 may also be configured to generate data representing the response of the vapor 204 to the thermal radiation 214. For example, the computing system 224 may include one or more processors (e.g., CPUs, GPUs, ASICs, FPGAs, etc.) and a memory (e.g., DRAM, flash memory, etc.). The memory may store instructions, that, when executed by the one or more processors, is configured to perform operations that include generating, based on the optical signal 212, transmission data that represents the transmission of one of the laser signals 208 (e.g., the probe laser signal 208a) through the vapor 204. The operations also include determining, based on the transmission data, a temperature of the target body 216 that generates the thermal radiation 214.

In some implementations, the transmission data includes first and second intensity values that are based on the one laser signal after passing through the vapor 204. For example, the first and second intensity values may be based on an intensity of the probe laser signal 208a, as measured by the optical detector 222, after passing through the vapor 204. Other properties, however, are possible, such as a frequency, a polarization, or a phase of the probe laser signal 208a. In these implementations, generating the transmission data may include generating the first intensity value as the laser signals 208 and the thermal radiation 214 interact with the vapor 204. Generating the transmission data may also include generating the second intensity value as the laser signals 208, the reference RF electromagnetic field 218, and the thermal radiation 214 interact with the vapor 204. In some implementations, the transmission data may also include a reference intensity value that represents an intensity of the one laser signal as measured directly by the optical detector 222 (e.g., without passing through the vapor cell sensor 202). The reference intensity value may, in certain cases, be required to generate the first and second intensity values.

The first and second intensity values (and possibly also the reference intensity value) may be used to determine the temperature of the target body 216. For example, determining the temperature of the target body 216 may include calculating, using the first and second intensity values, a magnitude of a parameter that is linearly dependent on the temperature of the target body 216. The temperature of the target body 216 may then be determined based on the magnitude of the parameter. An example of this parameter is described in relation to Equation (25).

In some implementations, the first and second intensity values are generated at different signal strengths of the one laser signal. In these implementations, determining the temperature of the target body 216 includes calculating, based on the first and second intensity values at each signal strength, respective magnitudes of a parameter that represents a relationship between first and second absorption terms. The first absorption term may represent an absorption of the one laser signal through the vapor 204 as the laser signals 208 and the thermal radiation 214 interact with the vapor 204. The second absorption term may represent an absorption of the one laser signal through the vapor 204 as the laser signals 208, the reference RF electromagnetic field 218, and the thermal radiation 214 interact with the vapor 204. An example of this second parameter is described in relation to Equations (26)-(27). The respective magnitudes of the parameter may then be used to generate values of the first and second absorption terms, which in turn, allow the temperature of the target body 216 to be determined. Further details are provided in relation to Equations (26)-(27) and FIG. 6.

In some implementations, the example radiometer 200 includes a communication channel 228a between the computing system 224 and the laser system 206. The communication channel 228a may be defined, for example, by a wired connection (e.g., an Ethernet connection) or a wireless connection (e.g., a WiFi connection). The example radiometer 200 may also include a power channel (e.g., an electrical power cable) between the computing system 224 and the laser system 206. In these implementations, the computing system 224 may be configured to control the laser system 206, thereby allowing the computing system 224 to control an optical property of one or more of the laser signals 208 generated by the laser system 206. Such control may include altering or maintaining the optical property, and examples of the optical property include an amplitude (e.g., an intensity), a frequency, a polarization, and a phase of the one or more laser signals 208. Combinations of optical properties are possible.

In implementations where the example radiometer 200 includes the RF source 220, the example radiometer 200 may include a communication channel between the computing system 224 and the RF source 220. The communication channel may be defined, for example, by a wired connection (e.g., an Ethernet connection) or a wireless connection (e.g., a WiFi connection). The example radiometer 200 may also include a power channel (e.g., an electrical power cable) between the computing system 224 and the RF source 220. Moreover, the computing system 224 may be configured to control the RF source 220, thereby allowing the computing system 224 to control a property of the reference RF electromagnetic field 218 generated by the RF source 220. Such control may include altering or maintaining the property, and examples of the property include an amplitude (e.g., an intensity), a frequency, a polarization, and a phase of the reference RF electromagnetic field 218. Combinations of properties are possible. Such control may also allow the computing system 224 to selectively match the reference RF electromagnetic field 218 to the Rydberg electronic transition of the vapor 204.

In some implementations, the example radiometer 200 includes a communication channel 228b between the computing system 224 and the optical detector 222. The communication channel 228b may be defined, for example, by a wired connection (e.g., an Ethernet connection) or a wireless connection (e.g., a WiFi connection). The example radiometer 200 may also include a power channel (e.g., an electrical power cable) between the computing system 224 and the optical detector 222. In these implementations, the computing system 224 may be further configured to control the optical detector 222, thereby allowing the optical detector 222 to measure one or more target properties of the optical signal 212. Such control may include controlling optical elements of the optical detector 222 to select a target optical property of the optical signal 212. Such control may also include controlling one or more photodetectors, each configured to measure a different target optical property.

In some implementations, the computing system 224 includes a computer that provides a user interface 230 for the example radiometer 200. Examples of the computer include a desktop computer, a workstation, a server, a laptop, a tablet, a mobile device, and so forth. The user interface 230 is configured to allow a user of the example radiometer 200 to view and manipulate the transmission data. However, other functionality is possible (e.g., controlling the laser system 206, the RF source 220, and the optical detector 222; displaying information related to the laser system 206, the RF source 220, and the optical detector 222; etc.). In some implementations, the optical detector 222 is configured to generate analog signals and the computing system 224 is configured to convert the analog signals into digital signals for processing. In these implementations, the computing system 224 may include circuits for parallel processing of the digital signals (e.g., FPGAs, ASICS, GPUs, etc.).

During operation of the example radiometer 200, the laser system 206 generates the probe and coupling laser signals 208a, 208b, which in turn, interact with the vapor 204 of the vapor cell sensor 202. In some instances, the probe laser signal 208a interacts with a probe optical transition of the vapor 204 (e.g., the first optical electronic transition 246a in FIGS. 2B and 2C). Similarly, the coupling laser signal 208b interacts with a coupling optical transition of the vapor 204 (e.g., the second optical electronic transition 246b in FIGS. 2B and 2C). The thermal radiation 214 from the target body 216 also interacts with the vapor 204 of the vapor cell sensor 202. In doing so, the thermal radiation 214 interacts with an RF electronic transition of the vapor 204 (e.g., the RF electronic transition 248 in FIGS. 2B and 2C).

In response, the vapor cell sensor 202 generates the optical signal 212. For example, the probe laser signal 208a may exit the vapor 204 after the probe laser signal 208a, the coupling laser signal 208b, and the thermal radiation 214 interact with the electronic states of the vapor 204. As such, the optical signal 214 may be based on the transmission of the probe laser signal 208a through the vapor 204. The optical detector 222 then receives the optical signal 212 and generates the detector signal 226 in response. The detector signal 226 represents the optical signal 212, and in particular, the transmission of the probe laser signal 208a through the vapor 204. In some instances, detector signal 226 also represents one or more optical properties of the optical signal 212. Examples of the one or more optical properties include an amplitude, a frequency, a polarization, and a phase of the optical signal 212. Combinations of optical properties are also possible.

In certain cases, the computing system 224 may instruct the RF source 220 to generate the reference RF electromagnetic field 218. In these cases, the vapor cell sensor 202 receives the reference RF electromagnetic field 218, which then interacts with the RF electronic transition of the vapor 204. In some instances, the RF source controls the reference RF electromagnetic field 218 to place the vapor cell sensor 202 in the amplitude regime. For example, the computing system 224 may instruct the RF source 220 to alter, via its RF attenuator, the amplitude of the reference RF electromagnetic field 218 to a target amplitude. The target amplitude has a magnitude that is configured to place the vapor cell sensor 202 in the amplitude regime when the reference RF electromagnetic field 218 interacts with the Rydberg electronic transition.

The computing system 224 receives the detector signals 226 from the optical detector 222 and proceeds to generate transmission data that represents the transmission of the probe laser signal 208a through the vapor 204. The transmission data is based on the optical signal 212 from the vapor cell sensor 202. The computing system 224 also determines the temperature of the target body 216 based on the transmission data. In some implementations, the transmission data includes intensity values. For example, the transmission data may include a reference intensity value. The computing system 224 may generate the reference intensity value as the probe laser signal is directly measured by the optical detector 222 (e.g., without passing through the vapor cell sensor 202). As another example, the transmission data may also include first and second intensity values that are based on the probe laser signal 208a after passing through the vapor 204. In these cases, the computing system 224 may generate the first intensity value as the laser signals 208 and the thermal radiation 214 interact with the vapor 204. In implementations where the RF source 220 generates the reference RF electromagnetic field 218, the computing system 224 may also generate the second intensity value as the laser signals 208, the reference RF electromagnetic field 218, and the thermal radiation 214 interact with the vapor 204. The intensity values of the transmission data may be used to determine the temperature of a target body, such as described in relation to Equations (21)-(27).

In some implementations, the computing system 224 may generate the transmission data over time. For example, the computing system 224 may generate, over time, sets of transmission data at different, respective times. In these cases, the temperature of the target body may be determined by producing, based on the sets of transmission data, corresponding temperatures of the target body at the different, respective times. The corresponding temperatures may define a time series of temperatures. As such, a final temperature may be calculated based on the time series of temperatures. The final temperature may define the temperature determined for the target body. In some instances, a statistical parameter may be applied to the time series of temperatures to calculate the final temperature. For example, a mean may be determined for the time series of temperatures to calculate the final temperature. As another example, a standard deviation may be determined for the time series of temperatures. If the standard deviation is below a threshold value, then a mean of the time series of temperatures may be determined to calculate the final temperature. Other statistical parameters and their combinations are possible.

In some implementations, the electronic states of the vapor 204 correspond to those described in relation to FIG. 2B. In some implementations, the electronic states of the vapor 204 correspond to those described in relation to FIG. 2C. In some implementations, the laser signals 208 include a second coupling laser signal that interacts with a second coupling optical transition of the vapor 204. The second coupling optical transition may, for example, correspond to the third optical electronic transition 246c of FIG. 2C.

Figure 3:
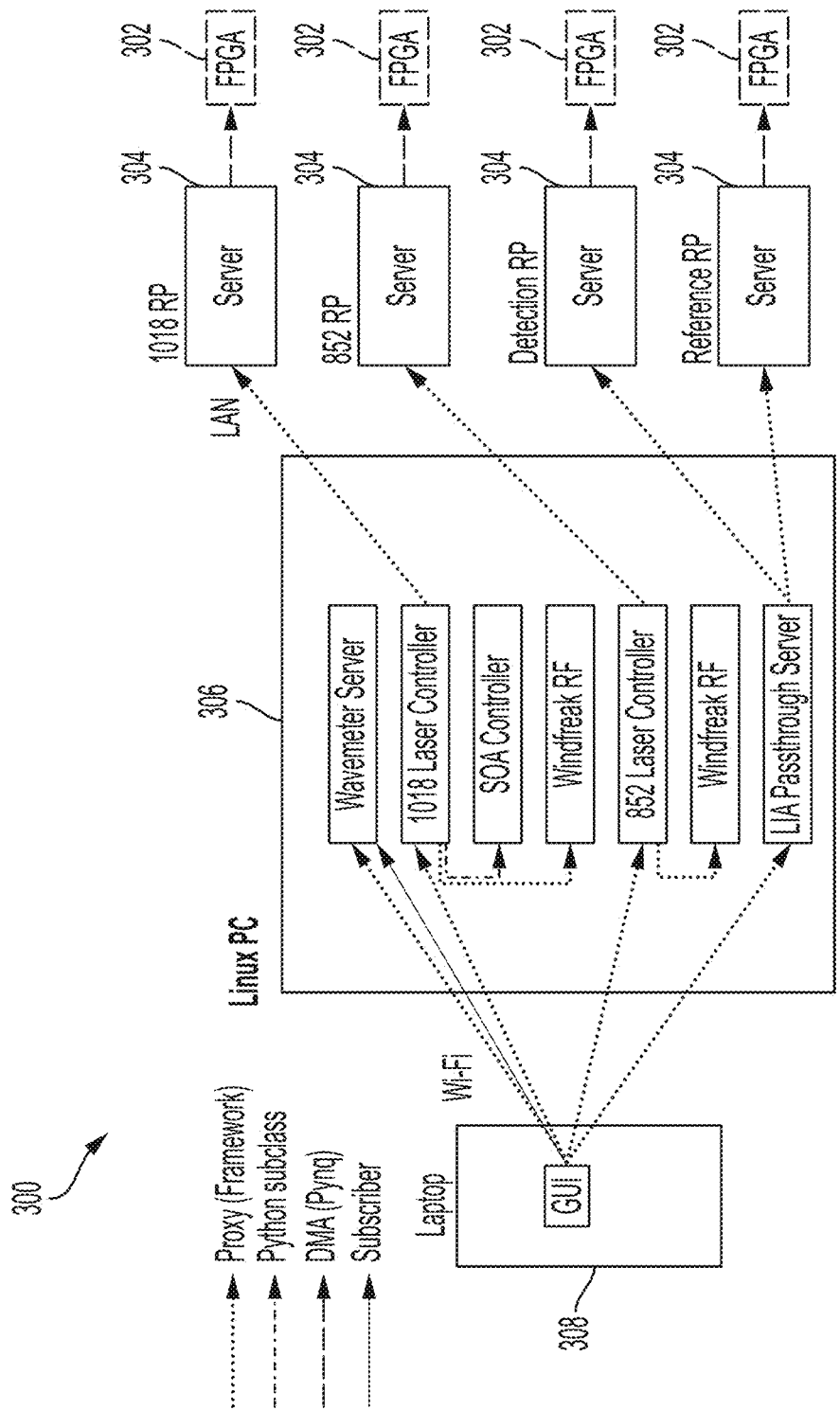
FIG. 3 is a schematic diagram of an example computing system for a radiometer that includes a vapor cell sensor.

Now referring to FIG. 3, a schematic diagram is presented of an example computing system 300 for a radiometer that includes a vapor cell. The computing system 300 may be analogous to the computing system 224 described in relation to FIGS. 2A-2C. The example computing system 300 may include one or more FPGAs 302 that control low level hardware processes and monitor systems like temperature and pressure sensors. A server 304 located on a processor of the FPGA board may handle the exchange of information with a second master processor. The second master processor 306, which may also be part of the example computing system 300, is configured to run a higher-level server that processes the information transferred to or from the FPGAs to run subsystems of the example control system. A user interface 308 allows a user to change parameters. The user interface 308 can run on the master processor or an external computer that connects to the master processor.

In some implementations, a radiometer includes two or more lasers configured for Rydberg vapor-based RF sensing. The lasers generate respective optical signals (e.g., beams of laser light) that pass through a vapor cell sensor. The vapor cell sensor can be a glass blown vapor cell, or one of a number of MEMs-type vapor cells. Examples of possible vapor cell sensors are described in U.S. Pat. No. 10,859,981 entitled "Vapor Cells Having One or More Optical Windows Bonded to a Dielectric Body", U.S. Pat. No. 11,112,298 entitled "Vapor Cells for Imaging of Electromagnetic Fields", and U.S. Pat. No. "Photonic-Crystal Vapor Cells for Imaging of Electromagnetic Fields". The laser signals can be transported to the vapor cell sensor in a waveguide, for example, via fiber optics, or can propagate in free space. In some variations, one or more of the lasers can be modulated for signal processing. An optical detector (e.g., a photodiode) reads out the light scattering from one of the lasers, usually light from the probe laser. The optical detector may be configured to detect the laser transmission or fluorescence.

In these implementations, a detector signal is used to derive the transmission or absorption of the probe laser signal. The detector signal can be converted to a digital signal through an analog to digital conversion circuit. The circuit can have amplifiers or other analog devices to tailor the signal for conversion to a digital signal. The amplifiers or other analog devices can also pre-process a modulated signal designed for noise reduction for subsequent conversion to a digital signal. Once the signal is digitized, it can undergo further signal processing in either a computer processor, a field programmable gate array (FPGA), a graphics processing unit (GPU), or some combination thereof.

The processed signal can be used to derive the lifetimes of the Rydberg atoms or Rydberg molecules from which a temperature can be determined. The temperature information and other data from the radiometer can be made available via a user interface that runs on a computing system. The computing system can also be used to input (e.g., via a user), monitor, and autonomously change (e.g., via higher level algorithms) control parameters to the lower-level elements of the system, like FPGAs and GPUs. Control systems can be used to stabilize the lasers to various frequency sensitive sub-systems, like vapor cell atomic references, wavemeters, and other types of interferometers (e.g., as Fabry-Perot cavities). The computing system can be configured to communicate with other computers or devices via networking hardware and protocols.

In some implementations, the radiometer includes an RF source such as, for example, an RF waveguide or an RF antenna. The radio frequency power at the vapor cell sensor can be calibrated by the radiometer using the principles of Rydberg vapor-based RF sensing. An attenuator at the RF source can be part of the radiometer and can be calibrated to operate the vapor cell in the amplitude regime in some cases. In some variations, the vapor cell sensor is encased in a low dielectric constant material to protect it as well as to help to make its temperature uniform, as determined by the emission of the object under test (e.g., the target object).

In some implementations, a model may be used to represent the physical processes by which the radiometer measures the temperature of a target body. In these implementations, the model may provide the basis for a method of operating the radiometer. The model may be represented by Equations (1)-(20), which are described below.

Bodies at a finite temperature can emit radiation. As such, the population of any mode at a given frequency v may be given by the Planck radiation law, $$\bar{n} = \frac{1}{e^{hv/kT} - 1} \approx \frac{kT}{hv}, \tag{1}$$

where T is the temperature, h is Planck's constant and k is Boltzmann's constant. The approximation in Equation (1) is obtained by assuming the argument of the exponential to be small. For a transition resonant with a particular mode; n'l' nl, where n (n') is the principal quantum number of initial (final) state and l (l') is the associated angular momentum quantum number; the stimulated emission rate due to excitations (photons) in that mode is found to be, $$K_{n'l',nl} = \bar{n} A_{n'l',nl}. \tag{2}$$

$A_{n'l',nl}$ is the zero-temperature spontaneous emission rate from nl to n'l'. Equation (2) can be rewritten in terms of the angular frequency, w, and oscillator strength, $\bar{f}_{n'l',nl}$, $$K_{n'l',nl} = -2\bar{n}\alpha^3 \omega^2_{n'l',nl} \bar{f}_{n'l',nl}. \tag{3}$$

Here, $\alpha$ is the polarizability of the atom or molecule. $\bar{f}_{n'l',nl}$ can be written in terms of the angular frequency of the transition and the transition dipole matrix element, $$\bar{f}_{n'l',nl} = \frac{2}{3} \omega_{n'l',nl} \frac{l_{max}}{2l+1} |\langle n'l'|r|nl\rangle|^2. \tag{4}$$

By summing over the final states, the enhancement of the decay rate can be obtained, which is termed the black-body decay rate, $\gamma_{BB}$, $$\gamma_{BB} = 2\alpha^3 \sum_{n'} \bar{n}\omega^2_{n'l',nl} |f_{n'l',nl}| + \tag{5}$$

$$\frac{2\pi}{3} \int_{\frac{1}{2n^2}}^{\infty} \left\{ \frac{l}{2l+1} |\langle nl|r|n'l-1\rangle|^2 + \frac{(l+1)}{2l+1} |\langle nl|r|n'l+1\rangle|^2 \right\} \rho(\omega) d\omega$$

$\gamma_{BB}$ can be approximated by ignoring transitions to the continuum and assuming the transition energy to be small compared to kT as, $$\gamma_{BB} = 2\alpha^3 kT \sum_n \omega_{n'l',nl} \bar{f}_{n'l',nl} \approx \frac{4\alpha^3 kT}{3n^2}, \tag{6}$$

Equation (6) shows that $\gamma_{BB}$ depends linearly on temperature under these conditions. The low thermal population per mode can be approximately satisfied for Rydberg electronic states whose transition frequency is in the RF domain since h/kT≈0.16 ps at room temperature. The total decay rate from any state is the sum of the spontaneous emission rate and the black-body induced emission rate, $$\gamma^T = \gamma_{nr} + \gamma_{BB}. \tag{7}$$

The effects of temperature on the decay rates of Rydberg electronic states have been observed under experimental conditions.

A Rydberg vapor-based sensor can be operated in the 'so-called' amplitude regime where the change in absorption is monitored. The absorption can be described by the Beer-Lambert law in the weak probe regime. The Beer-Lambert law describes the absorption as a function of propagation distance, z, through an atomic medium, $$I(z) = I_0 e^{-\alpha z}, \tag{8}$$

In Equation (8), $I_0$ is the initial intensity and $I(z)$ is the intensity that is detected on the optical detector after propagating a distance, z, through the atomic or molecular sample. The absorption coefficient, $\alpha$, describes the light-matter interaction, and $\alpha$ can be calculated using the density matrix formalism. The equation that describes $\alpha$ can be written in terms of the density matrix element coupling the probe transition, $\rho_{12}$, $$\alpha = \frac{3\pi n \lambda_P^3}{16\pi^3} k_P \frac{\gamma_2}{\Omega_P} \mathrm{Im}(\rho_{12}) = Ak_P \frac{\gamma_2}{\Omega_P} \mathrm{Im}(\rho_{12}). \tag{9}$$

Here, $\gamma_2$ is the spontaneous emission rate of the probe transition, $\lambda_P$ is the probe laser wavelength, n is the number of atoms, $k_P$ is the probe laser wavevector, and $\Omega_P$ is the probe laser Rabi frequency. To obtain $\alpha$ in the gas of moving atoms or molecules, it can be averaged over the thermal velocity distribution, $$P(v) = \sqrt{\frac{m}{2\pi k_B T}} \exp\left(\frac{-mv^2}{2k_B T}\right) = \frac{1}{\sqrt{\pi} \bar{v}} \exp\left(\frac{-v^2}{\bar{v}^2}\right). \tag{10}$$

In Equation (10), m is the mass of the atoms or molecules and $\bar{v}$ is the average thermal velocity. The thermally averaged $\alpha$ is, $$\alpha = Ak_P \frac{\gamma_2}{\Omega_P} \int_{-\infty}^{\infty} P(v) \mathrm{Im}(\rho_{12}(v)) dv. \tag{11}$$

There are several different cases that can be considered, all of which are relevant to radiometric applications. The form of the equations for the laddered order of electronic transitions shown in FIG. 1B allows the solution to be written as the product of a Lorentzian describing the absorption on the probe transition and a term that modulates the absorption. The term may include the influence of the coupling laser and the RF electromagnetic field.

In the case where the temperature approaches zero, the solution when the probe laser is on resonance can be reduced to:

$$\alpha = Ak_P \frac{1}{1 + \frac{C_C^2}{1 + C_{RF}^2}} = Ak_P L_0 S_0. \tag{12}$$

In Equation (12), $L_0$ is the probe Lorentzian on resonance which equals unity, and $S_0 = 1/(1 + (C_C^2/(1 + C_{RF}^2)))$ is the signal term. Moreover, $C_C$ is the coherence parameter on the coupling laser transition while $C_{RF}$ is the coherence parameter on the Rydberg electronic transition. The coherence parameters are a measure of how many Rabi oscillations occur on a respective transition before the atoms or molecules in the vapor dephase. The coherence parameters are defined as, $$C_P = \frac{\Omega_P}{\gamma_P}, \; C_C = \frac{\Omega_C}{\sqrt{\gamma_2 \gamma_3^T}}, \text{ and } C_{RF} = \frac{\Omega_{RF}}{\sqrt{\gamma_3 \gamma_4^T}}. \tag{13}$$

Equation (12) assumes that there is no phase dependence of the overall dynamics using these definitions as $\Omega = \Omega^*$. For example, the transitions can be phase sensitive in the steady-state if the addressed level system forms a loop, but in the ladder scheme (e.g., FIG. 1B), this is not the case, so the potential phase of the Rabi frequencies does not have to be considered. It is important to note that the entire expression in Equation (12) can be written in terms of the coherences, which contain all the Rabi frequency (laser-atom coupling parameters) and decay and dephasing terms. As a consequence, it is the coherences that can determine the atomic dynamics. If $C_C \gg C_{RF}$ and $C_C \gg 1$, then Equation (12) can be further simplified, thereby presenting an intuitive understanding of $\alpha$. In the case of large coupling laser coherence, $$\alpha = Ak_P \frac{1 + C_{RF}^2}{C_C^2} = \alpha_{EIT} + \alpha_{RF}, \tag{14}$$

where, $$\alpha_{RF} = Ak_P \frac{C_{RF}^2}{C_C^2} = Ak_P \frac{\gamma_2 \Omega_{RF}^2}{\gamma_4^T \Omega_C^2}, \tag{15}$$

and $$\alpha_{EIT} = \frac{Ak_P}{C_C^2}. \tag{16}$$

Examining these equations, it is easy to see that, if the RF electromagnetic field is zero, the absorption is modulated by the coupling laser. In other words, $\alpha_{EIT}$ describes the electromagnetically induced transparency (EIT) on resonance with the absorption decreasing as Cc increases. Adding an RF electromagnetic field resonant with the Rydberg electronic transition increases the absorption, $\alpha_{RF}$. The change in the on-resonant absorption is proportional in the amplitude regime to $C_{RF}^2/C_C^2$. As such, the change in absorption induced by the RF electromagnetic field is a function of the coherences rather than the Rabi frequencies. Simplifying the equations, it is found that the effect of the RF electromagnetic field is inversely proportional to $\gamma_4^T$, which in turn, changes with temperature through the black body decay rate. For a fixed, known RF electromagnetic field and coupling laser Rabi frequency, the only parameter that changes is $\gamma_4^T$ (as long as the vapor cell does not heat up). If the vapor cell sensor heats in a particular sensor configuration or application, a change in absorption can be used. This change can be measured by taking, for example, a ratio. However, other measurement modalities, however, are possible. Similarly, the ratio of $\alpha_{EIT}/\alpha_{EIT}$ can equal $1/C_{RF}^2$, which itself equals $\gamma_3 \gamma_4/\Omega_{RF}^2$. As can be seen by the latter term, the dependence of the ratio on $\Omega_C$ has been eliminated. The thermal dependence on both state 3 and state 4 can then contribute to the probe laser signal measured by the optical detector.

In the amplitude regime, the dependence of the signal on $C_{RF}^2/C_C^2$ is preserved as the complications of finite temperature and wavevector mismatch are considered. These latter parameters enter into the equations through the Doppler shifts that occur because the atoms are moving in the vapor cell. For the case of wavevector matching, the solution for the absorption with all the lasers and the RF electromagnetic field on resonance can be approximated by, $$\alpha = \frac{Ak_P}{\sqrt{\pi}\bar{v}} \int_{-\infty}^{\infty} \text{Im}\left(\frac{i}{2i\kappa_P v + S_0^{-1}}\right) e^{\frac{v^2}{\bar{v}^2}} dv, \quad (16)$$

$\alpha$ can be integrated to obtain a closed for expression, $$\alpha = \sqrt{\frac{\pi}{2}} \frac{Ak_P}{2\kappa_P \bar{v}} \exp\left(\frac{S_0^{-1}}{2\kappa_P \bar{v}}\right)^2 \left(1 - \text{erf}\left(\frac{S_0^{-1}}{2\kappa_P \bar{v}}\right)\right). \quad (17)$$

$\kappa_P = k_P/\gamma_P$. In many cases the argument of the error function is small and, $$\alpha = \frac{Ak_P}{2\kappa_P \bar{v}}\left(\sqrt{\frac{\pi}{2}} - \frac{S_0^{-1}}{2\kappa_P \bar{v}}\right). \quad (18)$$

Equation (18) is similar to the T=0 expression in Equation (14). The wavevector matching case is closely approximated by a three-photon readout method, particularly when the intermediate coupling laser transition can be adiabatically eliminated to for an 'effective' 3-level EIT ladder system. For finite temperature and laser field wavevector mismatch, the expression is slightly more complicated but maintains the same general form, $$\alpha = \frac{Ak_P \sqrt{\pi}}{\kappa_P \bar{v}}\left(\frac{\kappa_C - \kappa_P}{4C_C \sqrt{\kappa_P \kappa_C}} + \frac{C_{RF}^2(-\sqrt{\kappa_P \kappa_C}(\kappa_C - \kappa_P) + 2\kappa_P \kappa_{RF} C_C)}{4C_C(\sqrt{\kappa_P \kappa_C} + \kappa_{RF} C_C)^2}\right) \quad (19)$$

When $\Omega_C^2 \gg \gamma_2 \gamma_3$, $\Omega_C \gg k_P v$, and $\Omega_C \gg k_C v$, $$\alpha = \frac{Ak_P \sqrt{\pi}}{\kappa_P \bar{v}}\left(\frac{\kappa_C - \kappa_P}{4C_C \sqrt{\kappa_P \kappa_C}} + \frac{\kappa_P C_{RF}^2}{2\kappa_{RF} C_C^2}\right). \quad (20)$$

Here, $\kappa_C = |k_{eff}|/\gamma_3^T$ and $k_{RF} = |k_{eff}|/\gamma_4^T$, where $k_{eff} = k_P + k_C$. In all of these cases, other dephasing and decay processes can contribute to the Rydberg state decay, $\gamma_4^T$, but these effects can be controlled and mitigated. For example, the gas density can be controlled by regulating the temperature, the beam and vapor cell geometry can be used to reduce transit time broadening, and signal size and the laser Rabi frequencies can be adjusted to reduce the Rydberg density, and hence, the Rydberg atom collisions. These processes may, in certain cases, also hold for $\gamma_3^T$.

To make a temperature measurement, the RF source is used to illuminate the vapor cell, thereby generating a reference RF electromagnetic field. Rydberg vapor-based sensing is used to calibrate an RF attenuator so that the RF power can be reduced to the amplitude regime in a known way. In some cases, the Rabi frequency of the coupling laser can be calibrated by measuring the Autler-Townes splitting that it induces on the probe laser transition (e.g., $6S_{1/2}$ to $6P_{3/2}$ in FIG. 1B, the first optical electronic transition 246a in FIGS. 2B-2C, etc.). In the case of the coupling laser, an optical attenuator can be calibrated. The Rabi frequency of the coupling laser can also be derived from a measurement conducted with a calibrated optical power meter, photodiode, or other type of optical detector when it is necessary. The reference RF electromagnetic field and the coupling laser signal are maintained at constant power for a measurement. The transmission of the probe laser signal through the vapor then depends on the thermal population of the background field. For more population in the field being measured (e.g., at higher temperatures), using EIT, the transmission of the probe optical signal will increase (decrease). For electromagnetically induced absorption (EIA), the transmission of the probe laser signal will decrease. The frequency at which the measurements are made can be changed by changing the Rydberg electronic state or operating the system off-resonance. The dynamic range of the radiometer can be adjusted and improved by changing the Rabi frequencies of the fields used for the measurement.

In some implementations, a method may be used to determine the temperature of a target body, such as by using the radiometers 100, 200 described in relation to FIGS. 1A and 2A. The method may involve a parameter (e.g., n) that is linearly dependent of the temperature of the target body. For example, a radiometer may be setup as shown in FIG. 1A. The radiometer may include a laser system that includes probe and coupling lasers. The probe laser may generate a probe laser signal at about 852 nm, and the coupling laser may generate a coupling laser signal at about 509 nm.

In some implementations, the method includes measuring, by operation of an optical detector (OD), a reference intensity value represented by $I_0$. $I_0$ corresponds to the power of the probe laser signal as directly measured by the optical detector (e.g., without passing through the vapor cell sensor). The reference intensity value ($I_0$) may, in certain cases, be required to measure other intensity values, such as the first intensity value ($I_E$) and the second intensity value ($I_{RF}$) described below.

In some implementations, the method also includes measuring, by operation of the optical detector, a first intensity value represented by $I_E$. $I_E$ corresponds to the power of the probe laser signal as the probe and coupling lasers pass concurrently through the vapor cell sensor (e.g., interact with the vapor at a common interaction volume). Such passage may occur, in some instances, while the thermal radiation interacts with the vapor in the vapor cell sensor. However, the reference RF electromagnetic field is not present (e.g., the RF source is not generating the reference RF electromagnetic field). When the reference RF electromagnetic field is not present, the power of the probe laser signal detected by the optical detector can be expressed as, $$I_E = I_0 e^{-\alpha_{EIT} z}. \quad (21)$$

where $I_0$ is as described previously, z is the length of the vapor cell sensor (which contains a Cs vapor), and $\alpha_{EIT}$ is the absorption coefficient of the probe laser signal in the presence of the coupling laser signal. In the amplitude regime, $\alpha_{EIT}$ can be expressed as, $$\alpha_{EIT} = \frac{3N\lambda_p^3}{16\pi^2} k_p \frac{\gamma_2 \gamma_3}{\Omega_C^2} \quad (22)$$

Here, $\gamma_2$ is the spontaneous emission rate of the probe optical transition, $\gamma_3$ is the spontaneous emission rate of the first Rydberg electronic transition. $\lambda_p$ is the probe laser wavelength, N is the number of Cs atoms, $k_p$ is the probe laser wavevector, and $\Omega_C$ is the coupling laser Rabi frequency.

In some implementations, the method additionally includes measuring, by operation of the optical detector, a second intensity value represented by $I_{RF}$. $I_{RF}$ corresponds to the power of the probe laser signal as the probe and coupling lasers pass concurrently through the vapor cell sensor and while the reference RF electromagnetic radiation interacts with the vapor in the vapor cell sensor. In some instances, the thermal radiation interacts with the vapor in the vapor cell sensor. During the measurement of $I_{RF}$, the power of the probe laser signal detected on the optical detector is changed due to the state coupling between the first Rydberg electronic state and the second electronic Rydberg state, as shown in FIG. 1B. Equation (21) can be updated in this case to be, $$I_{RF} = I_0 e^{-(\alpha_{EIT} + \alpha_{RF})z}, \quad (23)$$

where $\alpha_{RF}$ is the supplemental absorption coefficient of the probe laser in the presence of the coupling laser and the reference RF electromagnetic field. In the amplitude regime, $\alpha_{RF}$ can be expressed as, $$\alpha_{RF} = \frac{3N\lambda_p^3}{16\pi^2} k_p \frac{\gamma_2 \Omega_{RF}^2}{\gamma_4 \Omega_C^2} \quad (22)$$

Here, $\gamma_4$ is the spontaneous emission rate of the second Rydberg electronic transition and $\Omega_{RF}$ is the Rabi frequency of the reference RF electromagnetic field.

In some implementations, the method includes determining a parameter that is based on a ratio of the first and second intensity values. For example, a ratio can be taken between $I_{RF}$ and $I_E$ to define a parameter, $\eta$, $$\eta = \frac{1}{\ln(I_E/I_{RF})} = \frac{1}{\alpha_{RF} z} = \frac{16\pi^2}{3N\lambda_p^3 k_p} \frac{\gamma_4 \Omega_C^2}{\gamma_2 \Omega_{RF}^2} \quad (25)$$

$\gamma_4$ linearly depends on the temperature of the black body, while the rest of the terms in Equation (25) are independent to the temperature. Thus, $\eta$ can be simplified to be a linear equation, $\eta = a + bT$. In many instances, the coefficients a and b are constant and can be calculated based on Equation (25). Thus, the black body temperature, T, can be determined by measuring $\eta$. In some implementations, $\eta$ can be used as a parameter to determine the temperature of a target body using, for instance, the example radiometers 100, 200 of FIGS. 1A and 2A.

In some implementations, the method may be used to make temperature measurements over time. For example, the method may include repeatedly determining n over time. The method may also include repeatedly measuring the first and second intensity values (and possibly also the reference intensity value) over time. In this way, the method may be used to generate a time series of temperatures for a target body, and a final temperature may be calculated based on the time series of temperatures. The final temperature may define the temperature determined for the target body. In some instances, a statistical parameter may be applied to the time series of temperatures to calculate the final temperature. In some implementations, and as part of taking the temperature measurements over time, the method may switch from a first target body to a second, different target body.

Figure 4:
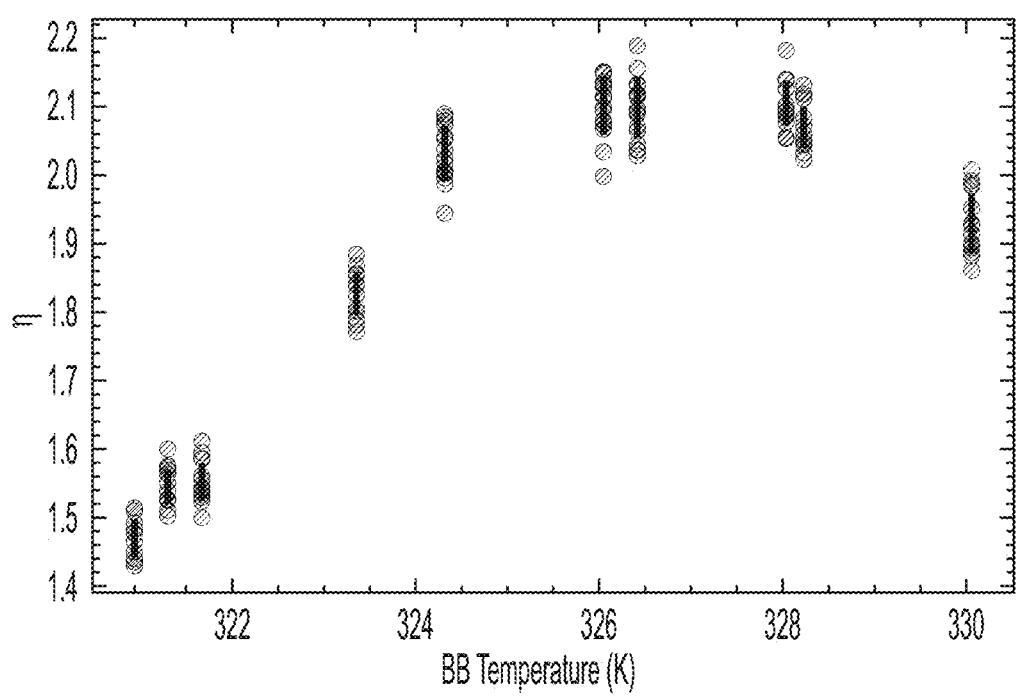
FIG. 4 is an example of a measured curve of parameter, n, versus a black body temperature, T.

In certain situations, however, the black body thermal radiation can heat up the vapor cell sensor and release Cs atoms out of the walls of the vapor cell sensor. Such heating can increase the number of Cs atoms, N, that interact with the laser signals. Thus, N(T) may also be a function of the black body temperature. In these cases, $\eta$ may no longer be a simple linear function of the black body temperature, and the quantity of N(T) may be difficult to determine. For example, and as shown in FIG. 4, $\eta$ may initially increase with the temperature, T, but then start decreasing as T keeps increasing due to the increase in the number of Cs atoms, N. FIG. 4 presents an example of a measured curve of $\eta$ versus a black body temperature, T. The parameter $\eta$ may be represented by Equation (25). The trend is not monocratically increasing due to a heating effect from the black body thermal radiation. In FIG. 4, the hatched circles represent measurements at specific black body temperatures.

In some implementations, the measured intensity values may be arranged to solve the problem of a vapor species (e.g., Cs atoms) changing in number during the measurement. This rearrangement may isolate the effect of the changing species number. For example, a second method may be used to determine the temperature of a target body using the radiometers 100, 200 described in relation to FIGS. 1A and 2A. In the second method, the reference intensity value ($I_0$), the first intensity value ($I_E$), and the second intensity value ($I_{RF}$) are measured as described in above in relation to Equations (21)-(24). However, instead of calculating the quantity, $\eta$, as shown in Equation (25), a parameter $\epsilon$ is defined that is based on a second arrangement of $I_E$ and $I_{RF}$. $\epsilon$ can be defined as follows:

$$\epsilon = \frac{\ln(I_{RF})}{\ln(I_E)} = \frac{\ln(I_0) - \alpha_{EIT} z - \alpha_{RF} z}{\ln(I_0) - \alpha_{EIT} z} \quad (26)$$

Figure 5:
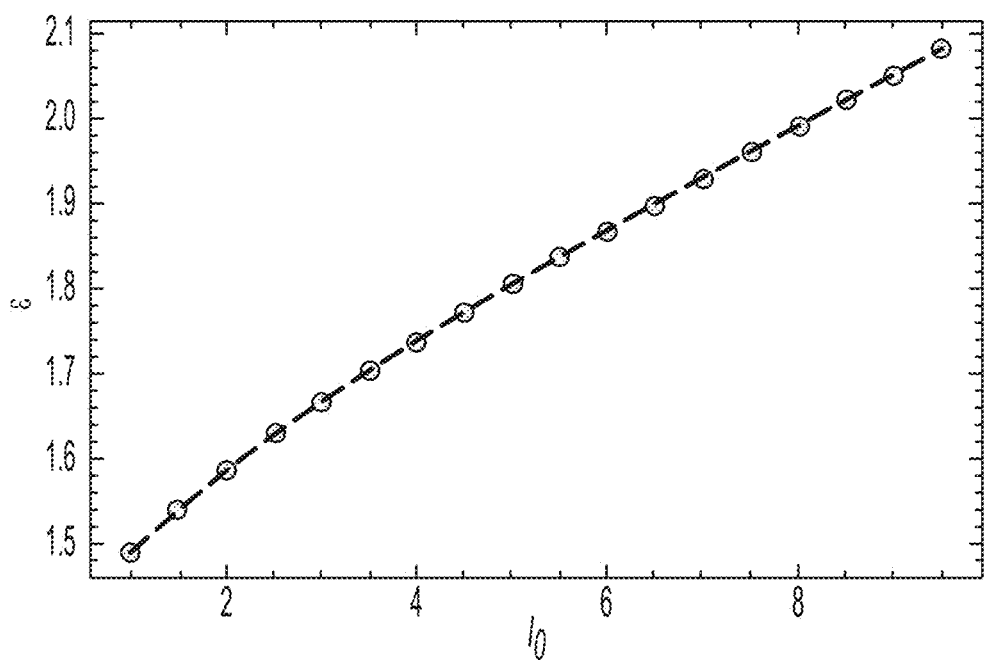
FIG. 5 is an example of a simulated curve of e versus a signal strength of a probe laser without a coupling laser and reference a RF electromagnetic field present.

In right side of Equation (26), $\epsilon$ represents a relationship between two absorption terms, $\alpha_{EIT} z$ and $\alpha_{RF} z$. Moreover, E can be measured at different reference powers of the probe laser, $I_0$. As such, the second method includes measuring the first and second intensity values (e.g., $I_E$ and $I_{RF}$) at different signal strengths of the probe laser (e.g., at different $I_0$). Corresponding magnitudes of $\epsilon$ can then be calculated at the different signal strengths, thereby producing a plot of $\epsilon$ versus $I_0$. An example of a simulated plot is shown in FIG. 5. FIG. 5 presents an example of a simulated curve of e versus the power (e.g., signal strengths) of the probe laser, $I_0$. The dots correspond to simulated data, and the dashed line represents a fitting of a curve to the dots, i.e., the simulated curve.

The second method also includes generating values of the two absorption terms, $\alpha_{EIT} z$ and $\alpha_{RF} z$, based on the calculated magnitudes of E. For example, the simulated curved in FIG. 5 can be fit to the right side of Equation (26) to extract the absorption terms, $\alpha_{EIT} z$ and $\alpha_{RF} z$. Then, a simple ratio can be obtained, $$\psi = \frac{\alpha_{EIT} z}{\alpha_{RF} z} = \frac{\gamma_3 \gamma_4}{\Omega_{RF}^2} \sim a + bT \quad (27)$$

This ratio is also a linear function of the black body temperature. The number of Cs atoms, N, has been cancelled out by taking the ratio, which can make the second method insensitive to changes in the atom number, N. However, in certain cases, the atom number should be constant during one black body temperature measurement. This requirement can may be achieved by waiting long enough for the temperature of the Cs vapor in the vapor cell sensor to stabilize. In this case, the thermal dependence of both $\gamma_3$ and $\gamma_4$ contribute to the temperature dependence.

In some implementations, the second method may be used to make temperature measurements over time. For example, the second method may include repeatedly generating, over time, the values of the two absorption terms, $\alpha_{EIT}z$ and $\alpha_{RF}z$, based on calculated magnitudes of e over time. The second method may also include repeatedly measuring the first and second intensity values (and possibly also the reference intensity value) over time. In this way, the second method may be used to generate a time series of temperatures for a target body that are insensitive to changes in the atom number, N. A final temperature may be calculated based on the time series of temperatures, and this final temperature may define the temperature determined for the target body. In some instances, a statistical parameter may be applied to the time series of temperatures to calculate the final temperature. In some implementations, and as part of taking the temperature measurements over time, the second method may switch from a first target body to a second, different target body.

Figure 6:
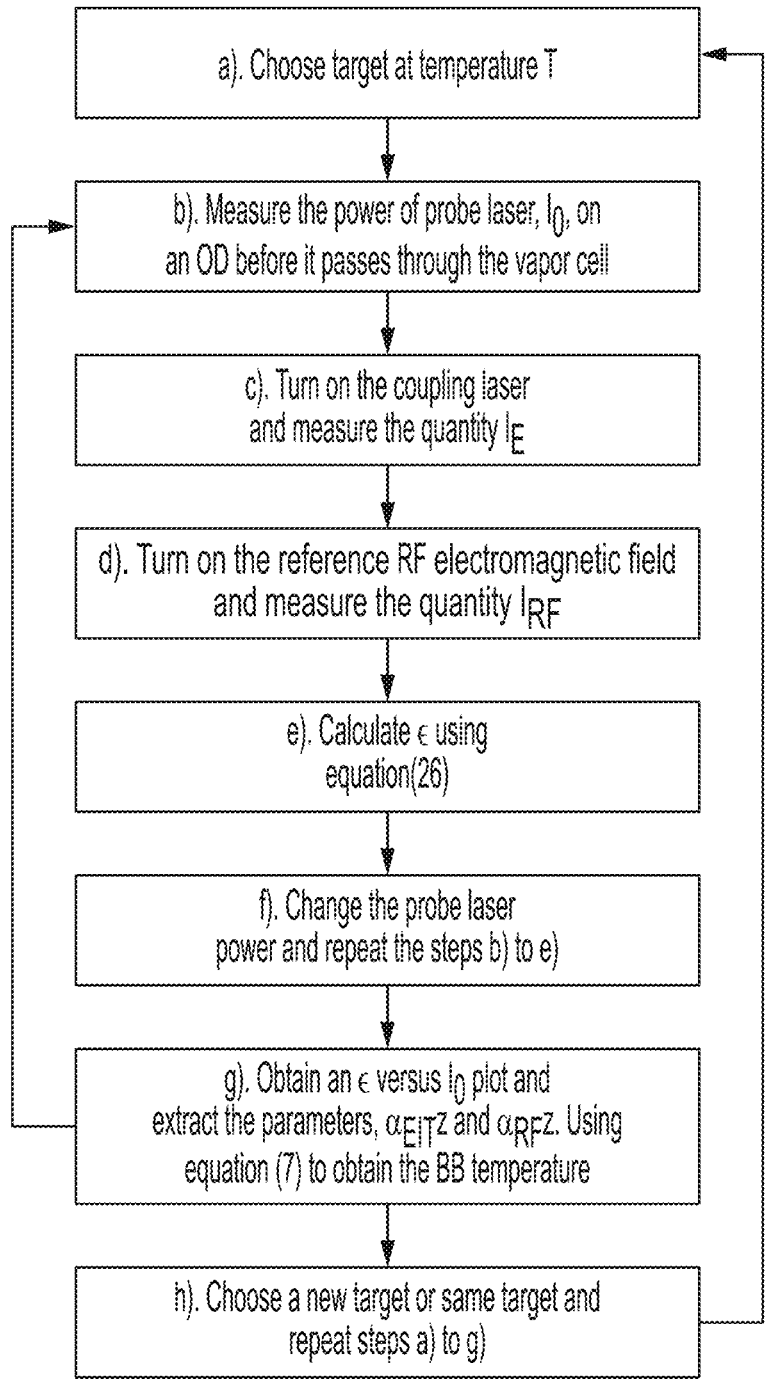
FIG. 6 is a flowchart of an example method for determining the temperature of a target body using a radiometer that includes a vapor cell sensor.

FIG. 6 presents a flowchart of an example method for determining the temperature of a target body using a radiometer that includes a vapor cell sensor. In the flowchart, the term "OD" refers to an optical detector. The example method may be analogous to the second method described in relation to Equations (26)-(27). However, to start the method, the vapor cell sensor is allowed to thermally equilibrate with the target body (e.g., a black body) before proceeding to measure the reference intensity value, $I_0$. The example method may be executed using the example radiometers 100, 200 described in relation to FIGS. 1A and 2A.

In some aspects of what is described, a radiometer may be described by the following examples. The radiometer may be configured to measure thermal radiation, including properties thereof (e.g., temperature, thermal flux, etc.). In certain cases, the radiometer is configured to measure the temperature of a black body emitting thermal radiation.

Example 1. A radiometer, comprising:
  a vapor cell sensor containing a vapor and configured to generate an optical signal in response to laser signals and thermal radiation interacting with the vapor, the vapor comprising a Rydberg electronic transition that is configured to interact with the thermal radiation, the optical signal based on a transmission of one of the laser signals through the vapor; and
  a computing system comprising one or more processors and a memory, the memory storing instructions that, when executed by the one or more processors, are configured to perform operations that comprise:
    generating, based on the optical signal, transmission data that represents the transmission of the one laser signal through the vapor, and
    determining, based on the transmission data, a temperature of a target body that generates the thermal radiation.

Example 2. The radiometer of example 1, comprising:
  an RF source configured to generate a reference RF electromagnetic field that is configured to interact with the Rydberg electronic transition.

Example 3. The radiometer of example 2, wherein the RF source comprises an RF attenuator configured to alter an amplitude of the reference RF electromagnetic field to a target amplitude, the target amplitude having a magnitude that places the vapor cell sensor in an amplitude regime when the reference RF electromagnetic field interacts with the Rydberg electronic transition.

Example 4. The radiometer of example 2 or example 3, wherein the transmission data comprises first and second intensity values that are based on the one laser signal after passing through the vapor;
  wherein generating the transmission data comprises:
    generating the first intensity value as the laser signals and the thermal radiation interact with the vapor, and
    generating the second intensity value as the laser signals, the reference RF electromagnetic field, and the thermal radiation interact with the vapor.

Example 5. The radiometer of example 4, wherein determining the temperature of the target body comprises:
  calculating, based on the first and second intensity values, a magnitude of a parameter that is linearly dependent on the temperature of the target body; and
  determining the temperature of the target body based on the magnitude of the parameter.

Example 6. The radiometer of example 4,
  wherein the first and second intensity values are generated at different signal strengths of the one laser signal; and
  wherein determining the temperature of the target body comprises:
    calculating, based on the first and second intensity values at each signal strength, respective magnitudes of a parameter that represents a relationship between first and second absorption terms, wherein:
      the first absorption term represents an absorption of the one laser signal through the vapor as the laser signals and the thermal radiation interact with the vapor, and
      the second absorption term represents an absorption of the one laser signal through the vapor as the laser signals, the reference RF electromagnetic field, and the thermal radiation interact with the vapor;
    generating values of the first and second absorption terms based on the respective magnitudes of the parameter; and
    determining the temperature of the target body based on the generated values of the first and second absorption terms.

Example 7. The radiometer of example 1 or any one of examples 2-6, comprising:
  a laser system configured to produce the laser signals, the laser signals comprising probe and coupling laser signals;
  wherein:
    the optical signal is based on a transmission of the probe laser signal through the vapor,
    the probe laser signal is configured to interact with a probe optical transition of the vapor, and
    the coupling laser signal is configured to interact with a coupling optical transition of the vapor.

Example 8. The radiometer of example 7,
  wherein the vapor has electronic states that comprise:
    first and second electronic states, and
    first and second Rydberg electronic states;
  wherein the first electronic state, the second electronic state, and the first Rydberg electronic state are progressively higher in energy; and
  wherein:

the probe optical transition is defined by the first and second electronic states, the coupling optical transition is defined by the second electronic state and the first Rydberg electronic state, and the Rydberg electronic transition is defined by the first and second Ryberg electronic states.

Example 9. The radiometer of example 7, wherein the coupling laser signal is a first coupling laser signal, and the laser signals comprise a second coupling laser signal; and wherein:
the optical signal is based on a transmission of the probe laser signal through the vapor, the probe laser signal is configured to interact with a probe optical transition of the vapor, the first coupling laser signal is configured to interact with a first coupling optical transition of the vapor, and the second coupling laser signal is configured to interact with a second coupling optical transition of the vapor.

Example 10. The radiometer of example 9, wherein the vapor has electronic states that comprise:
first, second, and third electronic states, and
first and second Rydberg electronic states;

wherein the first electronic state, the second electronic state, the third electronic state, and the first Rydberg electronic state are progressively higher in energy; and wherein:
the probe optical transition is defined by the first and second electronic states, the first coupling optical transition is defined by the second electronic state and the third electronic state, the second coupling optical transition is defined by the third electronic state and the first Rydberg electronic state, and the Rydberg electronic transition is defined by the first and second Ryberg electronic states.

Example 11. The radiometer of example 1 or any one of examples 2-10, comprising:
an optical detector that is configured to generate a detector signal in response to receiving the optical signal, the detector signal representing the transmission of the one laser signal through the vapor.

Example 12. The radiometer of example 1 or any one of examples 2-11, wherein the Rydberg electronic transition is configured to interact with thermal radiation corresponding to black body temperatures greater than 300° C.

Example 13. The radiometer of example 1 or any one of examples 2-12, comprising: the target body, external to the vapor cell sensor and in thermal communication therewith.

In some aspects of what is described, a method may be described by the following examples. The method may be used to measure thermal radiation, including properties thereof (e.g., temperature, thermal flux, etc.). For example, the method may be used to measure the temperature of a black body emitting thermal radiation.

Example 14. A method of measuring thermal radiation, the method comprising:
generating, by operation of a vapor cell sensor, an optical signal in response to laser signals and thermal radiation interacting with a vapor of the vapor cell sensor, the optical signal based on a transmission of one of the laser signals through the vapor, the vapor comprising a Rydberg electronic transition that is configured to interact with the thermal radiation;

generating, based on the optical signal, transmission data that represents the transmission of the one laser signal through the vapor; and determining, based on the transmission data, a temperature of a target body that generates the thermal radiation.

Example 15. The method of example 14, comprising:
generating, by operation of an RF source, a reference RF electromagnetic field that is configured to interact with the Rydberg electronic transition; and receiving the reference RF electromagnetic field at the vapor of the vapor cell sensor.

Example 16. The method of example 15, wherein the RF source comprises an RF attenuator; and wherein generating the reference RF electromagnetic field comprises altering, by operation of the RF attenuator, an amplitude of the reference RF electromagnetic field to a target amplitude, the target amplitude having a magnitude that places the vapor cell sensor in an amplitude regime when the reference RF electromagnetic field interacts with the Rydberg electronic transition.

Example 17. The method of example 15 or example 16, wherein the transmission data comprises first and second intensity values that are based on the one laser signal after passing through the vapor;

wherein generating the transmission data comprises:
generating the first intensity value as the laser signals and the thermal radiation interact with the vapor, and generating the second intensity value as the laser signals, the reference RF electromagnetic field, and the thermal radiation interact with the vapor.

Example 18. The method of example 17, wherein determining the temperature of the target body comprises:
calculating, based on the first and second intensity values, a magnitude of a parameter that is linearly dependent on the temperature of the target body; and determining the temperature of the target body based on the magnitude of the parameter.

Example 19. The method of example 17, wherein the first and second intensity values are generated at different signal strengths of the one laser signal; and wherein determining the temperature of the target body comprises:
calculating, based on the first and second intensity values at each signal strength, respective magnitudes of a parameter that represents a relationship between first and second absorption terms, wherein:
the first absorption term represents an absorption of the one laser signal through the vapor as the laser signals and the thermal radiation interact with the vapor, and the second absorption term represents an absorption of the one laser signal through the vapor as the laser signals, the reference RF electromagnetic field, and the thermal radiation interact with the vapor;

generating values of the first and second absorption terms based on the respective magnitudes of the parameter; and determining the temperature of the target body based on the generated values of the first and second absorption terms.

Example 20. The method of example 14 or any one of examples 15-19, wherein generating transmission data comprises generating, over time, sets of transmission data at different, respective times; and wherein determining the temperature of the target body comprises:
  determining, based on the sets of transmission data, corresponding temperatures of the target body at the different, respective times, the corresponding temperatures defining a time series of temperatures, and
  calculating a final temperature based on the time series of temperatures, the final temperature defining the temperature determined for the target body.

Example 21. The method of example 14 or any one of examples 15-20, comprising:
  generating the laser signals by operation of a laser system, the laser signals comprising probe and coupling laser signals;
  wherein:
    the optical signal is based on a transmission of the probe laser signal through the vapor,
    the probe laser signal is configured to interact with a probe optical transition of the vapor, and
    the coupling laser signal is configured to interact with a coupling optical transition of the vapor.

Example 22. The method of example 21,
  wherein the vapor has electronic states that comprise:
    first and second electronic states, and
    first and second Rydberg electronic states;
  wherein the first electronic state, the second electronic state, and the first Rydberg electronic state are progressively higher in energy; and
  wherein:
    the probe optical transition is defined by the first and second electronic states,
    the coupling optical transition is defined by the second electronic state and the first Rydberg electronic state, and
    the Rydberg electronic transition is defined by the first and second Ryberg electronic states.

Example 23. The method of example 21,
  wherein the coupling laser signal is a first coupling laser signal, and the laser signals comprise a second coupling laser signal; and
  wherein:
    the optical signal is based on a transmission of the probe laser signal through the vapor,
    the probe laser signal is configured to interact with a probe optical transition of the vapor,
    the first coupling laser signal is configured to interact with a first coupling optical transition of the vapor, and
    the second coupling laser signal is configured to interact with a second coupling optical transition of the vapor.

Example 24. The method of example 23,
  wherein the vapor has electronic states that comprise:
    first, second, and third electronic states, and
    first and second Rydberg electronic states;
  wherein the first electronic state, the second electronic state, the third electronic state, and the first Rydberg electronic state are progressively higher in energy; and
  wherein:
    the probe optical transition is defined by the first and second electronic states,
    the first coupling optical transition is defined by the second electronic state and the third electronic state,
    the second coupling optical transition is defined by the third electronic state and the first Rydberg electronic state, and
    the Rydberg electronic transition is defined by the first and second Ryberg electronic states.

Example 25. The method of example 14 or any one of examples 15-24, comprising:
  generating, by operation of an optical detector, a detector signal in response to receiving the optical signal at the optical detector, the detector signal representing the transmission of the one laser signal through the vapor.

Example 26. The method of example 14 or any one of examples 15-25, wherein the Rydberg electronic transition is configured to interact with thermal radiation corresponding to black body temperatures greater than 300° C.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A radiometer, comprising:
  a vapor cell sensor containing a vapor and configured to generate an optical signal in response to laser signals and thermal radiation interacting with the vapor, the vapor comprising a Rydberg electronic transition that is configured to interact with the thermal radiation, the optical signal based on a transmission of one of the laser signals through the vapor; and
  a computing system comprising one or more processors and a memory, the memory storing instructions that, when executed by the one or more processors, are configured to perform operations that comprise:
    generating, based on the optical signal, transmission data that represents the transmission of the one laser signal through the vapor, and
    determining, based on the transmission data, a temperature of a target body that generates the thermal radiation.

2. The radiometer of claim 1, comprising:
  an RF source configured to generate a reference RF electromagnetic field that is configured to interact with the Rydberg electronic transition.

3. The radiometer of claim 2, wherein the RF source comprises an RF attenuator configured to alter an amplitude of the reference RF electromagnetic field to a target amplitude, the target amplitude having a magnitude that places the vapor cell sensor in an amplitude regime when the reference RF electromagnetic field interacts with the Rydberg electronic transition.

4. The radiometer of claim 2,
wherein the transmission data comprises first and second intensity values that are based on the one laser signal after passing through the vapor;
wherein generating the transmission data comprises:
generating the first intensity value as the laser signals and the thermal radiation interact with the vapor, and
generating the second intensity value as the laser signals, the reference RF electromagnetic field, and the thermal radiation interact with the vapor.

5. The radiometer of claim 4, wherein determining the temperature of the target body comprises:
calculating, based on the first and second intensity values, a magnitude of a parameter that is linearly dependent on the temperature of the target body; and
determining the temperature of the target body based on the magnitude of the parameter.

6. The radiometer of claim 4,
wherein the first and second intensity values are generated at different signal strengths of the one laser signal; and
wherein determining the temperature of the target body comprises:
calculating, based on the first and second intensity values at each signal strength, respective magnitudes of a parameter that represents a relationship between first and second absorption terms, wherein:
the first absorption term represents an absorption of the one laser signal through the vapor as the laser signals and the thermal radiation interact with the vapor, and
the second absorption term represents an absorption of the one laser signal through the vapor as the laser signals, the reference RF electromagnetic field, and the thermal radiation interact with the vapor;
generating values of the first and second absorption terms based on the respective magnitudes of the parameter; and
determining the temperature of the target body based on the generated values of the first and second absorption terms.

7. The radiometer of claim 1, comprising:
a laser system configured to produce the laser signals, the laser signals comprising probe and coupling laser signals;
wherein:
the optical signal is based on a transmission of the probe laser signal through the vapor,
the probe laser signal is configured to interact with a probe optical transition of the vapor, and
the coupling laser signal is configured to interact with a coupling optical transition of the vapor.

8. The radiometer of claim 7,
wherein the vapor has electronic states that comprise:
first and second electronic states, and
first and second Rydberg electronic states;
wherein the first electronic state, the second electronic state, and the first Rydberg electronic state are progressively higher in energy; and
wherein:
the probe optical transition is defined by the first and second electronic states,
the coupling optical transition is defined by the second electronic state and the first Rydberg electronic state, and
the Rydberg electronic transition is defined by the first and second Ryberg electronic states.

9. The radiometer of claim 7,
wherein the coupling laser signal is a first coupling laser signal, and the coupling optical transition is a first coupling optical transition; and
wherein the laser signals comprise a second coupling laser signal that is configured to interact with a second coupling optical transition of the vapor.

10. The radiometer of claim 9,
wherein the vapor has electronic states that comprise:
first, second, and third electronic states, and
first and second Rydberg electronic states;
wherein the first electronic state, the second electronic state, the third electronic state, and the first Rydberg electronic state are progressively higher in energy; and
wherein:
the probe optical transition is defined by the first and second electronic states,
the first coupling optical transition is defined by the second electronic state and the third electronic state,
the second coupling optical transition is defined by the third electronic state and the first Rydberg electronic state, and
the Rydberg electronic transition is defined by the first and second Ryberg electronic states.

11. The radiometer of claim 1, comprising:
an optical detector that is configured to generate a detector signal in response to receiving the optical signal, the detector signal representing the transmission of the one laser signal through the vapor.

12. The radiometer of claim 1, wherein the Rydberg electronic transition is configured to interact with thermal radiation corresponding to black body temperatures greater than 300° C.

13. The radiometer of claim 1, comprising:
the target body, external to the vapor cell sensor and in thermal communication therewith.

14. A method of measuring thermal radiation, the method comprising:
generating, by operation of a vapor cell sensor, an optical signal in response to laser signals and thermal radiation interacting with a vapor of the vapor cell sensor, the optical signal based on a transmission of one of the laser signals through the vapor, the vapor comprising a Rydberg electronic transition that is configured to interact with the thermal radiation;
generating, based on the optical signal, transmission data that represents the transmission of the one laser signal through the vapor; and
determining, based on the transmission data, a temperature of a target body that generates the thermal radiation.

15. The method of claim 14, comprising:
generating, by operation of an RF source, a reference RF electromagnetic field that is configured to interact with the Rydberg electronic transition; and
receiving the reference RF electromagnetic field at the vapor of the vapor cell sensor.

16. The method of claim 15,
wherein the RF source comprises an RF attenuator; and
wherein generating the reference RF electromagnetic field comprises altering, by operation of the RF attenuator, an amplitude of the reference RF electromagnetic field to a target amplitude, the target amplitude having a magnitude that places the vapor cell sensor in an amplitude regime when the reference RF electromagnetic field interacts with the Rydberg electronic transition.

17. The method of claim 15,
wherein the transmission data comprises first and second intensity values that are based on the one laser signal after passing through the vapor;
wherein generating the transmission data comprises:
   generating the first intensity value as the laser signals and the thermal radiation interact with the vapor, and
   generating the second intensity value as the laser signals, the reference RF electromagnetic field, and the thermal radiation interact with the vapor.

18. The method of claim 17, wherein determining the temperature of the target body comprises:
   calculating, based on the first and second intensity values, a magnitude of a parameter that is linearly dependent on the temperature of the target body; and
   determining the temperature of the target body based on the magnitude of the parameter.

19. The method of claim 17,
wherein the first and second intensity values are generated at different signal strengths of the one laser signal; and
wherein determining the temperature of the target body comprises:
   calculating, based on the first and second intensity values at each signal strength, respective magnitudes of a parameter that represents a relationship between first and second absorption terms, wherein:
      the first absorption term represents an absorption of the one laser signal through the vapor as the laser signals and the thermal radiation interact with the vapor, and
      the second absorption term represents an absorption of the one laser signal through the vapor as the laser signals, the reference RF electromagnetic field, and the thermal radiation interact with the vapor;
   generating values of the first and second absorption terms based on the respective magnitudes of the parameter; and
   determining the temperature of the target body based on the generated values of the first and second absorption terms.

20. The method of claim 14,
wherein generating transmission data comprises generating, over time, sets of transmission data at different, respective times; and
wherein determining the temperature of the target body comprises:
   determining, based on the sets of transmission data, corresponding temperatures of the target body at the different, respective times, the corresponding temperatures defining a time series of temperatures, and
   calculating a final temperature based on the time series of temperatures, the final temperature defining the temperature determined for the target body.

21. The method of claim 14, comprising:
generating the laser signals by operation of a laser system, the laser signals comprising probe and coupling laser signals;
wherein:
   the optical signal is based on a transmission of the probe laser signal through the vapor,
   the probe laser signal is configured to interact with a probe optical transition of the vapor, and
   the coupling laser signal is configured to interact with a coupling optical transition of the vapor.

22. The method of claim 21,
wherein the vapor has electronic states that comprise:
   first and second electronic states, and
   first and second Rydberg electronic states;
wherein the first electronic state, the second electronic state, and the first Rydberg electronic state are progressively higher in energy; and
wherein:
   the probe optical transition is defined by the first and second electronic states,
   the coupling optical transition is defined by the second electronic state and the first Rydberg electronic state, and
   the Rydberg electronic transition is defined by the first and second Ryberg electronic states.

23. The method of claim 21,
wherein the coupling laser signal is a first coupling laser signal, and the coupling optical transition is a first coupling optical transition; and
wherein the laser signals comprise a second coupling laser signal that is configured to interact with a second coupling optical transition of the vapor.

24. The method of claim 23,
wherein the vapor has electronic states that comprise:
   first, second, and third electronic states, and
   first and second Rydberg electronic states;
wherein the first electronic state, the second electronic state, the third electronic state, and the first Rydberg electronic state are progressively higher in energy; and
wherein:
   the probe optical transition is defined by the first and second electronic states,
   the first coupling optical transition is defined by the second electronic state and the third electronic state,
   the second coupling optical transition is defined by the third electronic state and the first Rydberg electronic state, and
   the Rydberg electronic transition is defined by the first and second Ryberg electronic states.

25. The method of claim 14, comprising:
generating, by operation of an optical detector, a detector signal in response to receiving the optical signal at the optical detector, the detector signal representing the transmission of the one laser signal through the vapor.

26. The method of claim 14, wherein the Rydberg electronic transition is configured to interact with thermal radiation corresponding to black body temperatures greater than 300° C.

* * * * *

UNITED STATES PATENT AND TRADEMARK OFFICE
CERTIFICATE OF CORRECTION

PATENT NO. : 12,241,789 B2
APPLICATION NO. : 18/756988
DATED : March 4, 2025
INVENTOR(S) : Schmidt et al.

It is certified that error appears in the above-identified patent and that said Letters Patent is hereby corrected as shown below:

In the Specification

Column 1, Description of Drawings, Line 44 Delete "n," and insert -- $\eta$, -- therefor Column 1, Description of Drawings, Line 45 Delete "e" and insert -- $\epsilon$ -- therefor Column 4, Detailed Description, Line 20 Delete "106)," and insert -- 108), -- therefor Column 4, Detailed Description, Line 53 Delete "Ryberg" and insert -- Rydberg -- therefor Column 4, Detailed Description, Line 54 Delete "Ryberg" and insert -- Rydberg -- therefor Column 6, Detailed Description, Line 21 Delete "Ryberg" and insert -- Rydberg -- therefor Column 8, Detailed Description, Line 17 Delete "202" and insert -- 204 -- therefor Column 8, Detailed Description, Line 33 Delete "504." and insert -- 204. -- therefor Column 9, Detailed Description, Line 7 Delete "512." and insert -- 212. -- therefor Column 9, Detailed Description, Line 10 Delete "222" and insert -- 212 -- therefor Column 11, Detailed Description, Line 24 Delete "ASICS," and insert -- ASICs, -- therefor Column 14, Detailed Description, Line 30 Delete "w," and insert -- $\omega$, -- therefor Column 18, Detailed Description, Line 26 Delete "n)" and insert -- $\eta$) -- therefor Column 19, Detailed Description, Line 57 Delete "n" and insert -- $\eta$ -- therefor Signed and Sealed this
Twenty-seventh Day of May, 2025

Coke Morgan Stewart
*Acting Director of the United States Patent and Trademark Office*

Column 20, Detailed Description, Line 41 Delete "E" and insert -- $\epsilon$ -- therefor Column 20, Detailed Description, Line 48 Delete "e" and insert -- $\epsilon$ -- therefor Column 20, Detailed Description, Line 55 Delete "E." and insert -- $\epsilon$. -- therefor Column 21, Detailed Description, Line 12 Delete "e" and insert -- $\epsilon$ -- therefor Column 23, Detailed Description, Line 7 Delete "Ryberg" and insert -- Rydberg -- therefor Column 23, Detailed Description, Line 39 Delete "Ryberg" and insert -- Rydberg -- therefor Column 23, Detailed Description, Line 51 After "comprising:" insert -- ¶ -- therefor Column 25, Detailed Description, Line 40 Delete "Ryberg" and insert -- Rydberg -- therefor Column 26, Detailed Description, Line 5 Delete "Ryberg" and insert -- Rydberg -- therefor In the Claims Column 28, Line 5 In Claim 8, delete "Ryberg" and insert -- Rydberg -- therefor Column 28, Line 29 In Claim 10, delete "Ryberg" and insert -- Rydberg -- therefor Column 30, Line 25 In Claim 22, delete "Ryberg" and insert -- Rydberg -- therefor Column 30, Line 49 In Claim 24, delete "Ryberg" and insert -- Rydberg -- therefor